US012458276B2

(12) United States Patent
Balu et al.

(10) Patent No.: US 12,458,276 B2
(45) Date of Patent: Nov. 4, 2025

(54) METHODS FOR NON-INVASIVE, LABEL-FREE IMAGING OF CELLULAR IMMUNE RESPONSE IN HUMAN SKIN USING A NONLINEAR OPTICAL MICROSCOPY IMAGING SYSTEM

(71) Applicant: The Regents of the University of California, Oakland, CA (US)

(72) Inventors: Mihaela Balu, Irvine, CA (US); Anand Ganesan, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 241 days.

(21) Appl. No.: 18/202,874

(22) Filed: May 26, 2023

(65) Prior Publication Data

US 2023/0380752 A1 Nov. 30, 2023

Related U.S. Application Data

(60) Provisional application No. 63/346,312, filed on May 26, 2022.

(51) Int. Cl.
*A61B 5/00* (2006.01)
(52) U.S. Cl.
CPC ............ *A61B 5/414* (2013.01); *A61B 5/0071* (2013.01); *A61B 5/444* (2013.01); *A61B 5/4848* (2013.01)
(58) Field of Classification Search
CPC ....... A61B 5/0071; A61B 5/414; A61B 5/444; A61B 5/445; A61B 5/4848
See application file for complete search history.

(56) References Cited

U.S. PATENT DOCUMENTS

2018/0106729 A1    4/2018  Balu et al.
2021/0290556 A1*   9/2021  Williams ............... C12N 15/88

OTHER PUBLICATIONS

Kroger, M. et al. "In vivo non-invasive staining-free visualization of dermal mast cells in healthy, allergy and mastocytosis humans using two-photon fluorescence lifetime imaging". Sci Rep 10, 14930 (2020) (Year: 2020).*
Fast, A. et al. "Fast, large area multiphoton exoscope (FLAME) for macroscopic imaging with microscopic resolution of human skin". Sci Rep 10, 18093 (2020) (Year: 2020).*
Honda, T. et al. "Novel insights into cutaneous immune systems revealed by in vivo imaging". Allergology International 65, 228-234 (2016) (Year: 2016).*
Konig, K. et al. "In vivo non-invasive Multiphoton Tomography of Human Skin". Proc. SPIE 5990, Optically Based Materials and Optically Based Biological and Chemical Sensing for Defence II, 59900W (2005) (Year: 2005).*

(Continued)

*Primary Examiner* — Keith M Raymond
*Assistant Examiner* — Milton Truong
(74) *Attorney, Agent, or Firm* — Gavrilovich, Dodd & Lindsey LLP

(57) ABSTRACT

The disclosure provides noninvasive methods for the in vivo identification and characterization of various immune cell populations in human skin. The methods of the disclosure employ advanced imaging systems based on nonlinear optical microscopy to generate images that are analyzed to detect, identify, differentiate, and quantify immune cell populations in human skin by their morphological, metabolic and behavioral signatures.

20 Claims, 16 Drawing Sheets

(56) References Cited

OTHER PUBLICATIONS

Meleshina, A. et al. "Multimodal label-free imaging of living dermal equivalents including dermal papilla cells". Stem Cell Research & Therapy 9:84 (2019) (Year: 2019).*
Morone, D. et al. "Evaluation of cell metabolic adaptation in wound and tumour by Fluorescence Lifetime Imaging Microscopy". Sci Rep 10:6289 (2020) (Year: 2020).*
Gabriel, E.M. et al. "Intravital microscopy in the study of the tumor microenvironment: from bench to human application". Oncotarget, 9:28, 20165-20178 (2018) (Year: 2018).*
Alfonso-Garcia, A. et al. "Label-free identification of macrophage phenotype by fluorescence lifetime imaging microscopy", J. Biomed. Opt. 21(4), 046005 (2016) (Year: 2016).*
Balu et al., "In vivo multiphoton NADH fluorescence reveals depth-dependent keratinocyte metabolism in human skin." Biophys. J. 104:258-267 (2013).
Balu et al., "Distinguishing between benign and malignant melanocytic nevi by in vivo multiphoton microscopy." Cancer Res. 74:2688-2697 (2014).
Balu et al., "In vivo multiphoton microscopy of basal cell carcinoma." JAMA dermatology 151(10):1068-1074 (2015).
Balu et al., "Rapid mesoscale multiphoton microscopy of human skin." Biomed Opt Express 7(11):4375-87 (2016).
Balu et al., "In vivo multiphoton-microscopy of picosecond-laser-induced optical breakdown in human skin." Lasers in surgery and medicine 49(6):555-562 (2017).
Costa et al., "Reassessing Patterns of Response to Immunotherapy with PET: From Morphology to Metabolism." Radiographics. 41(1):120-43 (2021).
Dancik et al., "Use of multiphoton tomography and fluorescence lifetime imaging to investigate skin pigmentation in vivo." J. Biomed. Opt. 18:026022 (2013).
Denardo et al., "Macrophages as regulators of tumour immunity and immunotherapy." Nat Rev Immunol. 19(6):369-82 (2019).
Erdag et al., "Immunotype and immunohistologic characteristics of tumor-infiltrating immune cells are associated with clinical outcome in metastatic melanoma." Cancer Res. 72(5):1070-80 (2012).
Fast et al., "Fast, large area multiphoton exoscope (FLAME) for macroscopic imaging with microscopic resolution of human skin." Scientific Reports 10(1):18093 (2020).
Hernández et al., "Three-and four-photon absorption of a multiphoton absorbing fluorescent probe." Applied optics 43(28):5394-5398 (2004).
Ito et al., "F-FDG PET/CT for Monitoring of Ipilimumab Therapy in Patients with Metastatic Melanoma." J Nucl Med. 60(3):335-41 (2019).
Kim et al., "Immune-related adverse events are clustered into distinct subtypes by T-cell profiling before and early after anti-PD-1 treatment." Oncoimmunology 9(1):1722023 (2020).
Konig et al., "High-resolution multiphoton tomography of human skin with subcellular spatial resolution and picosecond time resolution." J. Biomed. Opt. 8:432 (2003).
Krasieva et al., "Two-photon excited fluorescence lifetime imaging and spectroscopy of melanins in vitro and in vivo." J. Biomed. Opt 18:031107 (2012).
Lentsch et al., "In vivo multiphoton microscopy of melasma." Pigment cell & melanoma research 32 (3), 403-411 (2019).
Lentsch et al., "Non-invasive optical biopsy by multiphoton microscopy identifies the live morphology of common melanocytic nevi." Pigment Cell Melanoma Res. 33(6):869-77 (2020).
Mittal et al., "Evaluation of stimulated Raman scattering microscopy for identifying squamous cell carcinoma in human skin." Lasers in surgery and medicine 45 (8):496-502 (2013).
Pouli et al., "Imaging mitochondrial dynamics in human skin reveals depth-dependent hypoxia and malignant potential for diagnosis." Science translational medicine 8(367):367ra169-367ra169 (2016).
Saager et al., "In vivo measurements of cutaneous melanin across spatial scales: Using multiphoton microscopy and spatial frequency domain spectroscopy." J. Biomed. Opt 20:066005 (2015).
Schafer et al., "Two-photon absorption cross-sections of common photoinitiators." Journal of Photochemistry and Photobiology A: Chemistry 162(2-3):497-502 (2004).
Schwarz et al., "Three-dimensional multispectral optoacoustic mesoscopy reveals melanin and blood oxygenation in human skin in vivo." J. Biophoton 9:55-60 (2016).
Seidenari et al., "Multiphoton laser tomography and fluorescence lifetime imaging of melanoma: Morphologic features and quantitative data for sensitive and specific non-invasive diagnostics." PloS ONE 8:e70682 (2013).
Tancrède-Bohin et al., "In vivo multiphoton imaging for non-invasive time course assessment of retinoids effects on human skin." Skin Res. Technol. 26:794-803 (2020).
Tang et al., "Effect of pulse duration on two-photon excited fluorescence and second harmonic generation in nonlinear optical microscopy." J. Biomed. Opt. 11:020501 (2006).
Vicente et al., "In vivo imaging with a fast large-area multiphoton exoscope (FLAME) captures the melanin distribution heterogeneity in human skin." Sci Rep 12:8106 (2022).
Wong et al., "The Advantages and Challenges of Using FDG PET/CT for Response Assessment in Melanoma in the Era of Targeted Agents and Immunotherapy." Eur J Nucl Med Mol Imaging. 44(Suppl 1):67-77 (2017).

* cited by examiner

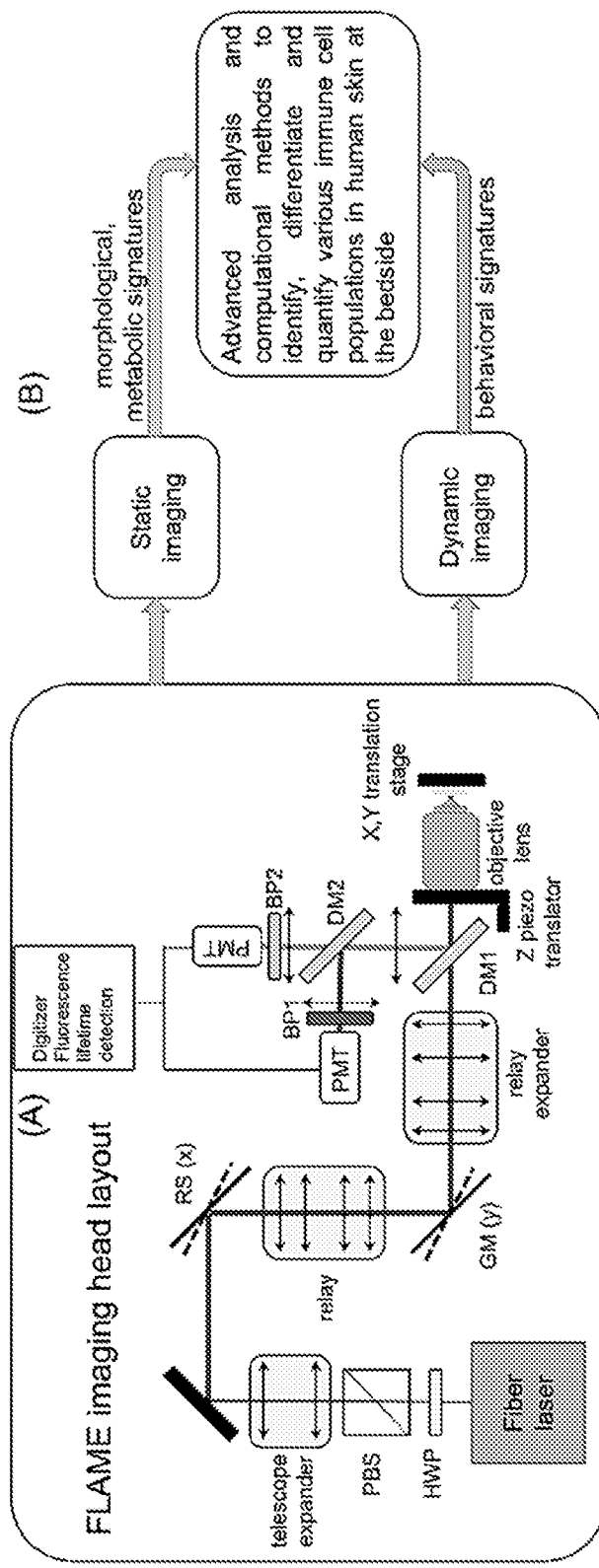
FIG. 2A-B

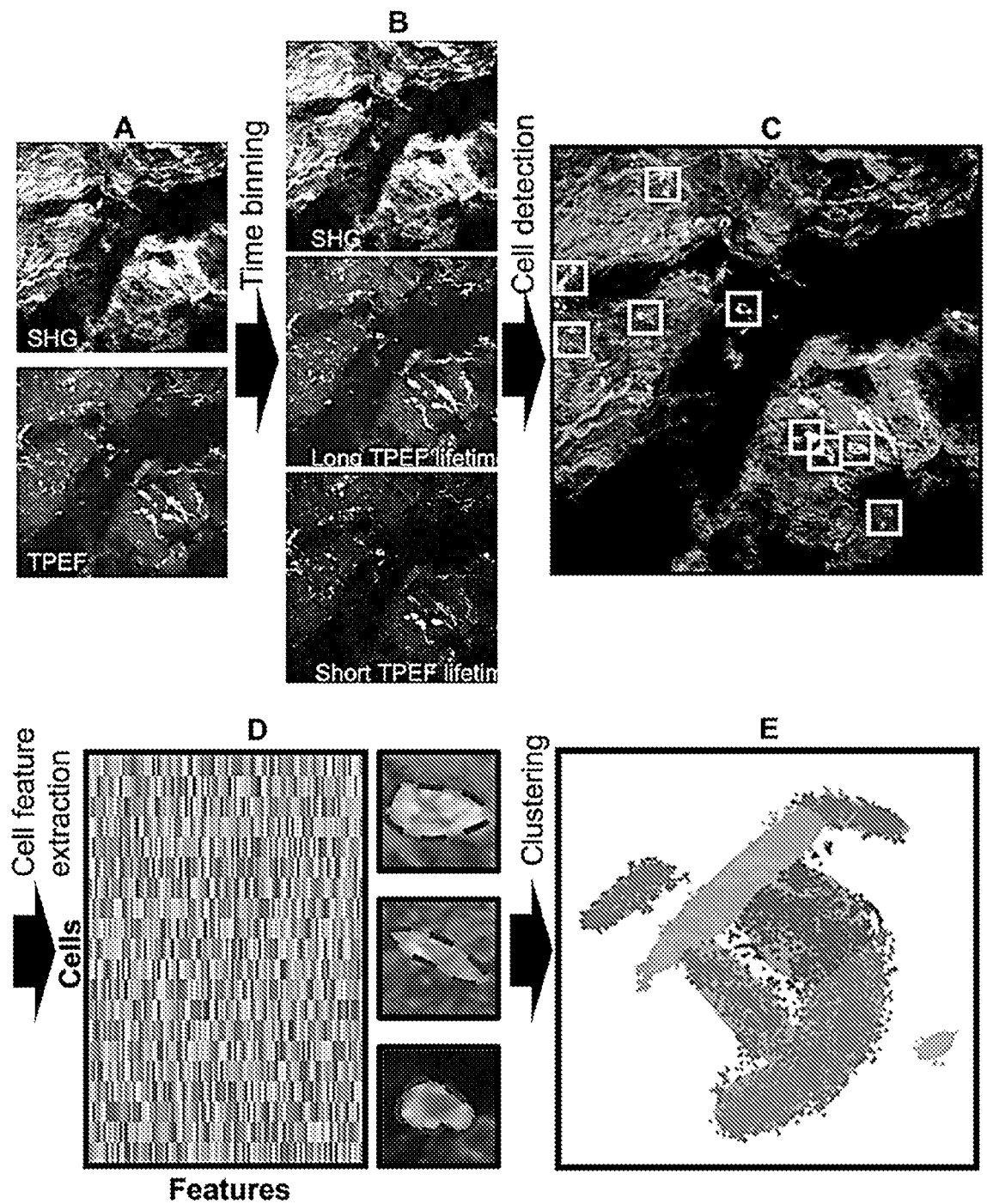
FIG. 5A-E

METHODS FOR NON-INVASIVE, LABEL-FREE IMAGING OF CELLULAR IMMUNE RESPONSE IN HUMAN SKIN USING A NONLINEAR OPTICAL MICROSCOPY IMAGING SYSTEM

CROSS REFERENCE TO RELATED APPLICATIONS

This application claims priority under 35 U.S.C. § 119 from Provisional Application Ser. No. 63/346,312 filed May 26, 2022, the disclosure of which is incorporated herein by reference.

STATEMENT OF GOVERNMENT SUPPORT

This invention was made with Government support under Grant No. R01EB026705 awarded by the National Institutes of Health. The Government has certain rights in the invention.

TECHNICAL FIELD

The disclosure relates to the field of medical imaging, specifically methods for the non-invasive, label-free imaging of the cellular immune response in human skin using a nonlinear optical imaging system or platform.

BACKGROUND

The study of mammalian immune cells and their interactions with tissue in situ is important for understanding autoimmune disease initiation and designing better therapeutic strategies. Current imaging techniques and platforms are limited, however, in that they are not capable of efficiently, and rapidly imaging immune cells beneath the surface of skin, and further, are not able to distinguish immune cells based on their morphology, metabolic state, and behavior. Accordingly, there is a need for new imaging processes that can address the foregoing limitations while being noninvasive and can be carried out at a patient's bedside.

SUMMARY

The disclosure provides methods that leverage state of art imaging devices with innovative analysis techniques to enable an application currently not achievable by other means: the identification, differentiation and quantification of various immune cell populations in human skin at the bedside through the detection and analysis of morphological, metabolic and behavioral signatures of the cells.

In a particular embodiment, the disclosure provides a noninvasive method for the in vivo identification and characterization of various immune cell populations in human skin, comprising: imaging a region of human skin from a subject to detect immune cells noninvasively by using a nonlinear optical imaging system that generates depth-resolved images over large areas with sub-micron resolution based on fluorescence signals generated from one or more endogenous biomolecules found in human skin, wherein one of the endogenous biomolecules is the reduced form of nicotinamide adenine dinucleotide (NADH); analyzing the image(s) generated from the nonlinear optical imaging system to retrieve information about the metabolic signatures of the detected immune cells by temporal binning the decays of fluorescence lifetime signals of the one or more endogenous biomolecules, and performing slope fluorescence decay analysis; and distinguishing various immune cell populations based on their morphological and metabolic signatures by using computational analysis. In a further embodiment, the nonlinear optical imaging system is a fast, large area multiphoton exoscope (FLAME)-based imaging system. In yet a further embodiment, the nonlinear optical imaging system is used in combination with other imaging modalities selected from RCM, OCT and/or photoacoustic imaging. In another embodiment, the nonlinear optical imaging system is used for dynamic imaging of the immune response in human skin based on endogenous molecular contrast. In yet another embodiment, the computational analysis automatically distinguishes various immune cell populations based on their morphological, metabolic and behavioral signatures. In a further embodiment, the subject has or is suspected of having a skin disorder or disease. In yet a further embodiment, the skin disease or disorder is selected from skin cancer, autoimmune skin disorders, skin infections, cold sore, hives, actinic keratosis, rosacea, latex allergy, eczema, psoriasis, measles, contact dermatitis, chickenpox, seborrheic eczema, keratosis pilaris, and impetigo. In a certain embodiment, the autoimmune skin disorder is selected from Behcet's disease, dermatitis herpetiformis, dermatomyositis, lichen planus, linear IgA disease, lupus of the skin, morphea/scleroderma, ocular cicatricial pemphigoid, pemphigoid, pemphigus, and vasculitis. In another embodiment, the skin infection is selected from acne, boils, carbuncle, warts, ringworm, and cellulitis. In yet another embodiment, the method quantitates or monitors the molecular characteristics of T cells, melanophages, macrophages and/or any other immune cells in the region of skin from the subject. In a further embodiment, the method detects activated T-cells in the region of skin.

In a particular embodiment, the disclosure also provides a method for evaluating and/or monitoring the effectiveness of a therapy or therapies in stimulating or, alternatively, suppressing an immune response in a skin lesion, comprising: (1) imaging a skin lesion from a subject by using a nonlinear optical imaging system that comprises a fast, large area multiphoton exoscope (FLAME) device or an imaging platform with similar performance, alone or in combination with other imaging modalities; (2) administering one or more therapies to the subject; (3) imaging the skin lesion from a subject by using a nonlinear optical imaging system that comprises the FLAME device or the imaging platform with similar performance, alone or in combination with other imaging modalities; and (4) comparing the images of the skin lesion before and after the administration of the one or more therapies to the subject to evaluate or monitor the effectiveness of the therapy or therapies in stimulating or, alternatively, suppressing an immune response in the skin lesion. In another embodiment, the other imaging modalities are RCM and/or OCT and/or photoacoustic imaging. In yet another embodiment, the skin lesion is associated with a skin disorder or disease selected from skin cancer, autoimmune skin disorders, skin infections, cold sore, hives, actinic keratosis, rosacea, latex allergy, eczema, psoriasis, measles, contact dermatitis, chickenpox, seborrheic eczema, keratosis pilaris, and impetigo. In a further embodiment, the autoimmune skin disorder is selected from Behcet's disease, dermatitis herpetiformis, dermatomyositis, lichen planus, linear IgA disease, lupus of the skin, morphea/scleroderma, ocular cicatricial pemphigoid, pemphigoid, pemphigus, and vasculitis. In yet a further embodiment, the skin infection is selected from acne, boils, carbuncle, warts, ringworm, and cellulitis. In yet a further embodiment, the method quantitates or monitors the molecular characteristics of T cells, melanophages, and/or macrophages in the skin lesion. In a certain embodiment, the method detects activated T-cells in the skin lesion. In another embodiment, the one or more therapies are immunotherapies. In yet another embodiment, the immunotherapies are selected from pembrolizumab, nivolumab, cemiplimab, atezolizumab, avelumab, durvalumab, ipilimumab, tisotumab vedotin-tftv, tisagenlecleucel, axicabtagene ciloleucel, and blinatumomab.

The details of one or more embodiments of the disclosure are set forth in the accompanying drawings and the description below. Other features, objects, and advantages will be apparent from the description and drawings, and from the claims.

DESCRIPTION OF DRAWINGS

FIG. 2A-B provides a schematic comprising the components of an optical system of the disclosure. (A) Layout of an exemplary imaging head of a FLAME system-based device that can be utilized in the methods and approaches of the disclosure to provide rapid detection of fluorescence lifetime signals. (B) Exemplary advanced imaging analysis and computational methods that can be used in the methods and approaches of the disclosure to obtain metabolic signatures from cells and automatically distinguish different cell populations based on a complete set of optical signatures (e.g., morphological, metabolic, and behavioral). The imaging data can be obtained from static and dynamic imaging to identify, differentiate and quantify various immune cell populations in human skin at the bedside. HWP: half-wave plate; PBS: polarizing beam splitter; RS: resonant scanner; GM: galvanometric mirror; DM: dichroic mirror; BP: bandpass filter; PMT: photomultiplier tube. The two ended arrows represent lenses.

FIG. 5A-E presents proposed workflow for the determination of unique immune cell populations in human skin. The FLAME image (A) is first converted into a 3-channel image (B) by time-binning, then the individual cells are identified using a cell detection algorithm (C). (D) Morphologic, metabolic, and behavioral features are computed using all available time bins; and (E) the final concatenated features across all individual cells are used as input into unsupervised clustering algorithms to isolate separate cell populations.

DETAILED DESCRIPTION

Figure 1A:
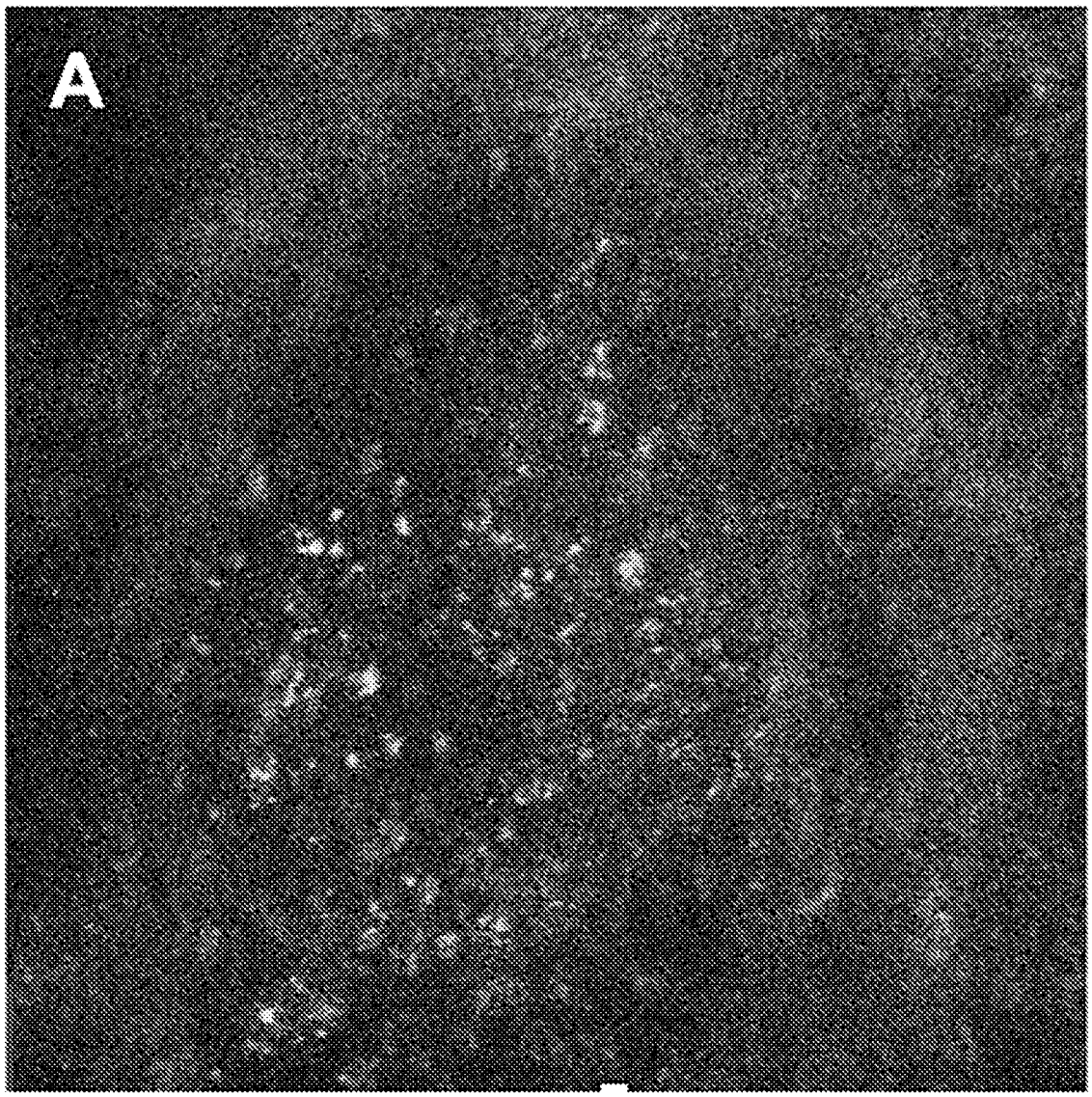
FIG. 1A-C presents images acquired ex vivo from an inflamed scarred lesion using nonlinear optical microscopy (TPEF and SHG detection). The immune cells (A) were imaged based on the detection of TPEF signals from their NADH. The image of the surrounding collagen fibers (B) was captured simultaneously based on their SHG signal. The merged image of the two detection channels (TPEF and SHG) is shown in (C). The foregoing technique, however, is very limited, in that it provides only information about immune cell morphology. In direct contrast, the methods and approaches of the disclosure can distinguish immune cells in human skin based upon a variety of optical signatures, including morphological signals, metabolic signals, and behavioral signals.

As used herein and in the appended claims, the singular forms "a," "an," and "the" include plural referents unless the context clearly dictates otherwise. Thus, for example, reference to "an image" includes a plurality of such images and reference to "the imaging technique" includes reference to one or more imaging techniques and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although many methods and reagents are similar or equivalent to those described herein, the exemplary methods and materials are disclosed herein.

All publications mentioned herein are incorporated herein by reference in full for the purpose of describing and disclosing the methodologies, which might be used in connection with the description herein. Moreover, with respect to any term that is presented in one or more publications that is similar to, or identical with, a term that has been expressly defined in this disclosure, the definition of the term as expressly provided in this disclosure will control in all respects.

The study of mammalian immune cells and their interactions with tissue in situ is important for understanding autoimmune disease initiation and designing better therapeutic strategies. Intravital multiphoton microscopy (MPM) combined with a rich repertoire of fluorescent reporter mouse models and in vivo cell and tissue labeling techniques have made it possible to visualize immune cell-tissue interactions at a cellular/subcellular level. This approach has provided important insights into several processes, such as cutaneous dendritic cell function and migratory behavior, macrophage heterogeneity across normal and cancerous skin tissue, and T cell cytotoxic activity during adoptive T cell therapy. There are significant differences in the structure and immune milieu of human skin, however, that limits the translatability of these findings to the human cutaneous immune response.

Recent advances in the development of humanized rodent models that can support the engraftment of both human skin and immune system components have been proposed to ameliorate this issue, but these models have numerous limitations including the limited lifespan of human immune cells in these models and the potential for xeno-reactive graft-versus-host disease and its ensuing complications.

A recent study attempted to image the cellular-level immune response in human skin in a clinical setting using reflectance confocal microscopy (RCM), but the approach's specificity is limited. RCM cannot distinguish between different immune cell populations and measure their activity in inflamed skin, since its contrast mechanism is based on differences in refractive indices among different skin components and does not provide molecular contrast. RCM gray scale images only offer information about cellular morphology, which is limited.

MPM, a laser-scanning nonlinear optical microscopy technique, can provide intrinsic molecular contrast thereby allowing for imaging living tissues in their native environment by detecting unique signals such as second-harmonic generation (SHG) from collagen and two-photon excited fluorescence (TPEF) from elastin, NADH/FAD+, melanin, and keratin. Moreover, MPM can detect specific skin fluorophores based on their fluorescence lifetime detection, with melanin being the most straightforward to detect due to its significantly shorter fluorescence lifetime compared to the rest of the endogenous fluorophores in skin. Another skin fluorophore of interest is NADH. The fluorescence lifetime of the cellular NADH depends on the ratio of its free and protein-bound components and thus, represents a measurement of the metabolic signature of the cell. The ability to selectively detect NADH from other skin fluorophores would have an impact on evaluating cellular metabolism in skin, particularly for studying metabolic changes related to skin conditions such as cancer and determining metabolic signatures related to different cell populations, including immune cells. This enhances the label-free specificity of their detection and thus the ability to distinguish them.

Figure 1B:
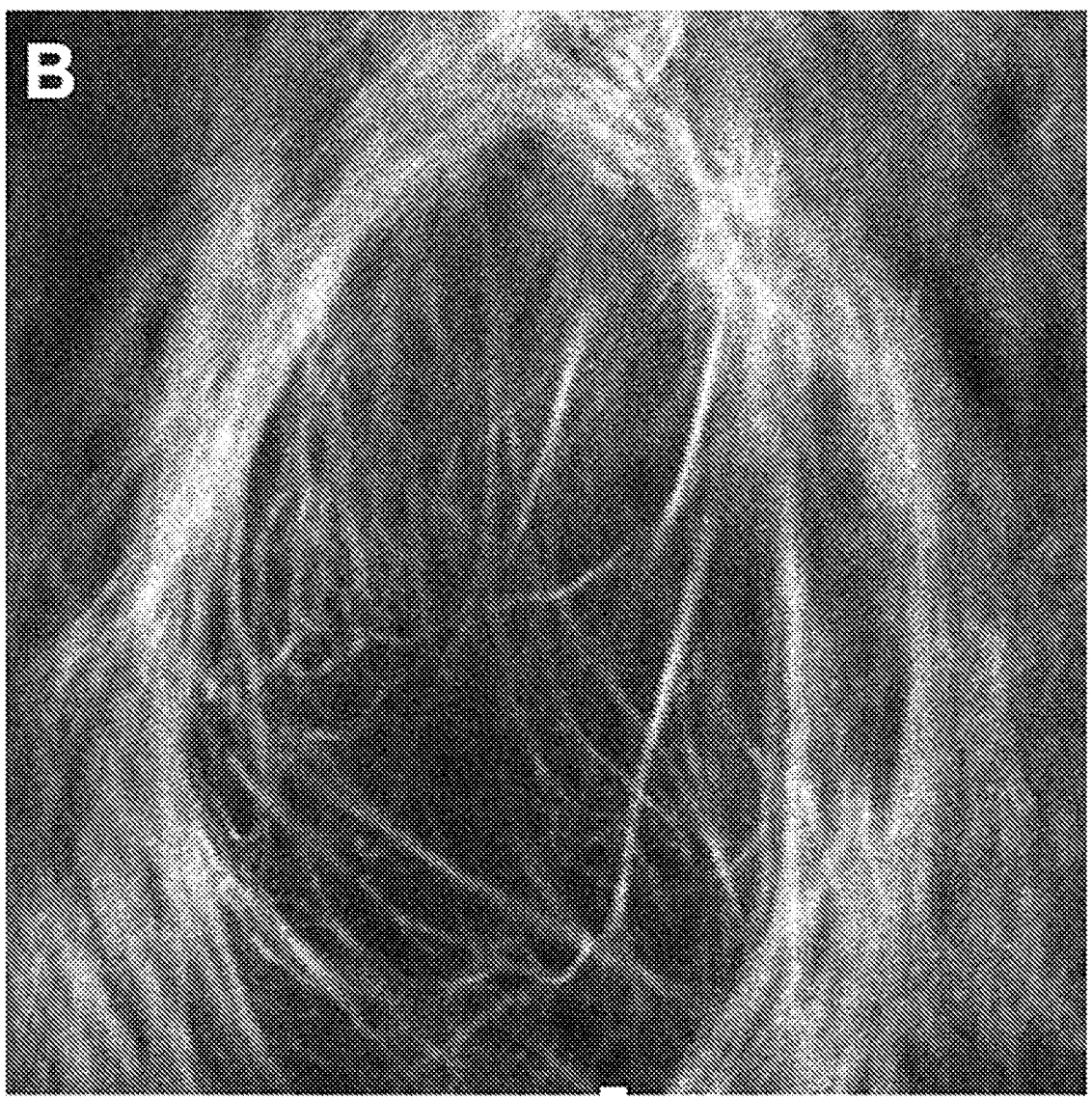
Figure 1C:
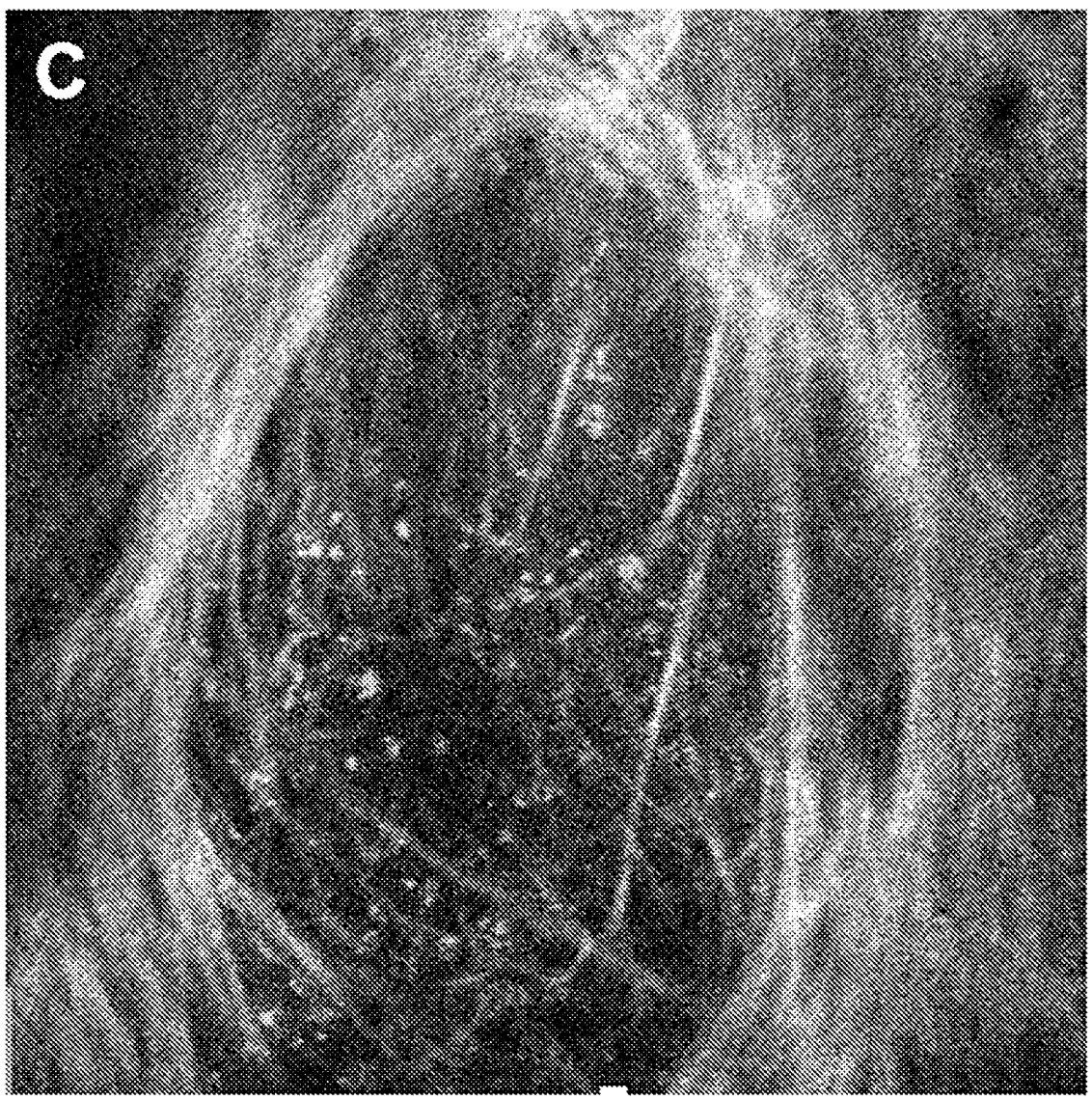

While MPM enables metabolic imaging based on the detection of cells' NADH/FAD fluorescence intensity and lifetime, challenges remain when it comes to detecting, identifying, and quantifying immune cell populations in human skin. Although the development of MPM-based imaging platforms has addressed challenges related to rapid scanning and wide area imaging that is important for capturing the heterogeneity and the dynamic of the immune response; the MPM-based imaging platforms are limited to capturing only the different morphologies of immune cells in skin (see FIG. 1). This is similar to what has been reported by using a commercial MPM and RCM devices. Distinguishing between different immune cell populations based solely on morphological signatures can be challenging as many cell types share similar characteristics.

To address the foregoing limitations, the imaging device needs to capture additional optical signatures related to metabolism and behavior. MPM can uniquely provide access to information about cellular metabolic changes based on detecting the cells' NADH/FAD TPEF lifetime. Cellular metabolic imaging of immune cells based on their NADH/FAD TPEF lifetime has been demonstrated in several recent studies for different types of immune cells imaged in vitro, for macrophages and T-cells in mouse models and for mast cells in vivo in human skin. However, the approach used in these studies are based on time-correlated single photon counting (TCSPC), is associated with long pixel dwell times (tens of microseconds), limiting the scanning speed to a minimum of a few seconds per frame for 512×512 pixel frame. This approach is not compatible with faster scanning rates that are required in clinical settings.

Access to information about the behavior of immune cells in human skin is also valuable for distinguishing immune cells based on their speed in addition to morphology and metabolic states of the cells. Based on dynamic imaging experiments in mice models and human skin (ex vivo), the speeds of neutrophils and T-cells are significantly higher compared to the speeds of other immune and dermal cells.

To provide comprehensive information about immune cell populations in human skin at the bedside, there is a need for a noninvasive method that can efficiently image the immune cells beneath the skin surface, distinguish them based on their morphology, metabolic state, and behavior, and cover larger areas rapidly. The ability to provide information about their morphology, metabolic state, and behavior enhances label-free imaging specificity and potential to distinguish immune cell populations. Large area imaging (ranging from millimeter to centimeter scale) with subcellular resolution is important in capturing immune response heterogeneity and monitoring the response to treatments by easily finding the same area for imaging. Rapid imaging is also important for capturing fast dynamics, mitigating motion artifacts, and ensuring clinical feasibility.

Besides clinical research and applications related to diagnosis and monitoring of immune skin diseases, additional clinical applications are related to the development and evaluation of immunotherapies. Fluorodeoxyglucose (FDG) PET/CT is among the most commonly used imaging methods for monitoring immunotherapy responses in patients with cancer, but this approach cannot be used to measure immune responses in skin. It identifies metabolic activity within the tumor tissue, but since both tumor cells and immune infiltrates can be FDG-avid, it is challenging to differentiate patients with progression from those with 'pseudo-progression' using this approach. T-cells activation in the tumor microenvironment has been suggested as key predicting factor and early indicator of immunotherapy response, while the presence of tumor-associated macrophages is generally associated with a poor prognosis in solid tumors. Moreover, it is known that excessive infiltration of specific types of T cells can be responsible for immune related adverse events, a potentially fatal side effect of immunotherapy. Novel clinical imaging tools that can image in vivo, at the cellular level, the skin and tumor microenvironment, are needed to pinpoint when immune reactions initiate, quantify how they progress, and determine how they respond to therapy. This is particularly needed in cancer immunotherapy.

The disclosure provides innovative noninvasive methods and approaches that can rapidly distinguish immune cells in skin based on their morphology, metabolic state, and behavior. Further, the methods and approaches disclosed herein can be performed at the patient's bedside. The methods and approaches disclosed herein are distinguishable from other methods known in the art in their ability to identify, differentiate and quantify immune cell populations in human skin through the analysis of morphological, metabolic and behavioral signatures obtained from in vivo images of human skin, without use of exogenous contrast agents. In a certain embodiment, the methods and approaches disclosed herein utilize a nonlinear optical microscopy platform. Use of such a platform can provide contrast based on second-harmonic generation (SHG) from collagen and two-photon excited fluorescence (TPEF) lifetime and intensity signals from elastin, NADH/FAD+, melanin, and keratin.

Accordingly, the methods and approaches of the disclosure can detect and quantify the immune response in human skin, even at the patient's bedside. Being able to do so has significant implications for clinical research and for clinical applications, including but not limited to: (1) non-invasive diagnosis of immune skin disorders or diseases, reducing medical costs and avoiding pain for patients; (2) understanding the biogenesis of autoimmunity in human skin, which is critical for developing therapies to inhibit it; (3) visualizing autoimmunity in skin to assess the effectiveness of expensive immunomodulatory therapies (including, but not limited to, therapies for psoriasis, atopic dermatitis, lupus, vitiligo, and other inflammatory skin diseases), reducing medical costs; (4) visualizing immune cell populations in the microenvironment of human skin cancer (melanoma and non-melanoma skin cancer including Merkel cell cancer) to better understand tumor behavior at the cellular level; and (5) visualizing skin side effects of cancer immunotherapy (or other therapies) (classified as immune related adverse events) at the bedside to evaluate the immune response so therapies can be switched when needed.

In a particular embodiment, the methods and approaches described herein comprise the use of a nonlinear optical microscopy imaging platform to image immune cells in skin. An example of such a platform can be found in U.S. Pat. No. 10,595,770 B2, the disclosure of which is incorporated herein in full. For the nonlinear optical microscopy imaging platform, imaging contrast is based on second-harmonic generation (SHG) from collagen and two-photon excited fluorescence (TPEF) intensity signals from elastin, NADH/FAD+, melanin, and keratin. It captures in vivo depth-resolved images beneath the skin surface, rapidly (tens of seconds), over large areas (millimeter to centimeter scale) with microscopic resolution (0.5-1 micrometer). In a particular embodiment the nonlinear optical microscopy imaging platform is a fast, large area multiphoton exoscope (FLAME)-based imaging platform—an improved version the imaging system described in U.S. Pat. No. 10,595,770 B2 that can provide fluorescence lifetime detection. A FLAME-based imaging system combines optical and mechanical scanning mechanisms with deep learning image restoration to produce depth-resolved images that encompass sub-mm$^2$ to cm$^2$ scale areas of tissue within minutes and provide means for a comprehensive analysis of live or resected thick human skin tissue. An in-depth review of a FLAME based imaging system is described in the publication by Fast et al. ("Fast, large area multiphoton exoscope (FLAME) for macroscopic imaging with microscopic resolution of human skin." Scientific Reports 10:18093 (2020)), the disclosure of which is incorporated herein in-full. FIG. 2-6 provides examples of images acquired from a FLAME-based imaging system. While a FLAME-based imaging system can be used in the methods of the disclosure, the disclosure is not limited to just using a FLAME-based system and encompasses imaging platforms that have similar performance. Generally, the nonlinear optical microscopy imaging platform is capable of acquiring depth resolved images over large areas, e.g., areas of at least 0.5×0.5 mm$^2$. In a particular embodiment the nonlinear optical imaging system generates depth-resolved images from a region of skin having an area of 0.5×0.5 mm$^2$, 0.6×0.6 mm$^2$, 0.7×0.7 mm$^2$, 0.8×0.8 mm$^2$, 0.9×0.09 mm$^2$, 1.0×1.0 mm$^2$, 1.1×1.1 mm$^2$, 1.2×1.2 mm$^2$, 1.3×1.3 mm$^2$, 1.4×1.4 mm$^2$, 1.5×1.5 mm$^2$, 1.6×1.6 mm$^2$, 1.7×1.7 mm$^2$, 1.8×1.8 mm$^2$, 1.9×1.9 mm$^2$, 2.0×2.0 mm$^2$, 2.2×2.2 mm$^2$, 2.4×2.4 mm$^2$, 2.6×2.6 mm$^2$, 2.8×2.8 mm$^2$, 3.0×3.0 mm$^2$, 3.5×3.5 mm$^2$, 4.0×4.0 mm$^2$, 4.5×4.5 mm$^2$, 5.0×5.0 mm$^2$, 5.5×5.5 mm$^2$, 6.0×6.0 mm$^2$, 6.5×6.5 mm$^2$, 7.0×7.0 mm$^2$, 7.5×7.5 mm$^2$, 8.0×8.0 mm$^2$, 8.5×8.5 mm$^2$, 9.0×9.0 mm$^2$, 9.5×9.5 mm$^2$, 10.0×10.0 mm$^2$, 11.0×11.0 mm$^2$, 12.0×12.0 mm$^2$, 13.0×13.0 mm$^2$, 14.0×14.0 mm$^2$, 15.0×15.0 mm$^2$, 20.0×20.0 mm$^2$, 30.0×30.0 mm$^2$, 40.0×40.0 mm$^2$, 50.0×50.0 mm$^2$, 60.0×60.0 mm$^2$, 70.0×70.0 mm$^2$, 80.0×80.0 mm$^2$, 90.0×90 mm$^2$, or 100.0×100.0 mm$^2$ or a range that includes or is in between any two of the foregoing area sizes (e.g., from 0.5×0.5 mm$^2$ to 100.0×100.0 mm$^2$, from 0.5×0.5 mm$^2$ to 5.0×5.0 mm$^2$, etc.), including fractional increments thereof. For the methods disclosed herein the nonlinear optical microscopy imaging platform can used in combination with other imaging modalities including, but not limited to, RCM, OCT and photoacoustic imaging.

In a certain embodiment, the methods and approaches described herein comprise analyzing the image(s) generated from a nonlinear optical imaging system to retrieve information about the metabolic signatures of the detected immune cells. This method step is based on digitizing the analog output of the detector (usually a photomultiplier tube) at a fast rate (at least 1.5 GHz). A clock multiplier board multiplies the excitation laser repetition rate (usually 80 MHz) by a factor of at least 16, which sets up the temporal resolution for detecting the fluorescence photons based on their arrival time (fluorescence lifetime detection). The time resolution is relatively coarse as it depends on the detector rise time and the digitization rate but, since it is not limited by the dead time associated with photon counting, this is a fast method to rapidly separate some fluorophores based on their shorter versus longer fluorescence lifetime. The layout of an exemplary detection method of immune cells in human skin using a nonlinear optical microscopy imaging platform is presented in FIG. 2. The images in FIG. 3A-C acquired in vivo by the nonlinear optical microscopy imaging platform from the normal skin of a volunteer's forearm demonstrate the feasibility to detect different dermal cell populations (including immune cells) based on their metabolic signatures (fluorescence lifetime of cells' NADH). The images were acquired by detecting the TPEF signal in 16-time bins at an effective rate of 2 s/frame for a 1 Mpx image acquired over 0.9×0.9 mm$^2$. The cells' NADH fluorescence signal detected in 16-time bins by using an 80 MHz laser excitation corresponds to 0.78 ns temporal resolution. While the studies presented herein detect the TPEF signal in 16-time bins, it should be understood any number of time bins may be utilized.

Figure 3A:
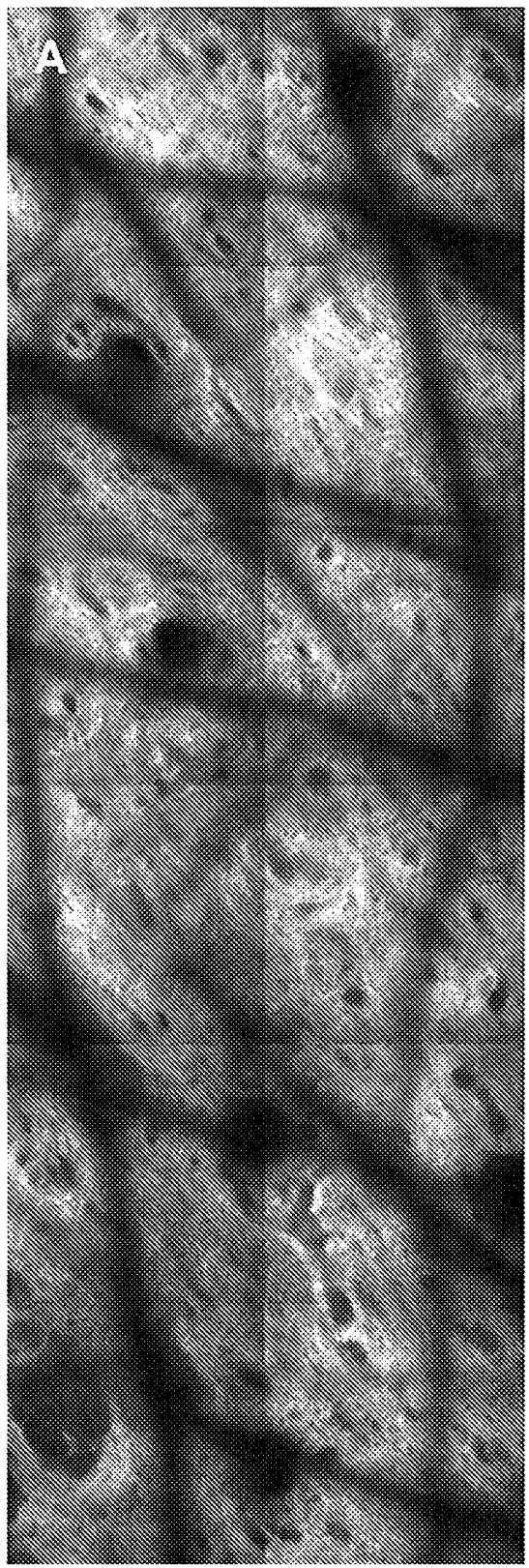
FIG. 3A-D presents in vivo FLAME images of dermal cell populations (including immune cells) in human skin. (A-C) Mm-scale MPM images (0.75 mm×2.2 mm) acquired at a depth of 95 microns, in vivo, from the dermis of a volunteer's forearm showing collagen (A) and elastin (B, arrows) fibers surrounding pigmented keratinocytes (C, arrows) around hair follicles. The dark lines represent skin folds. The images were acquired simultaneously based on the detection of SHG signal (A) and TPEF fluorescence lifetime (B and C). (D) The slopes of the fluorescence lifetime decay of three dermal cell populations (representative cells indicated by dashed circles in (B)) along with the slope of the fluorescence decay for pigmented cells (representative cells indicated by arrows in (C)). For visualization purposes, the dermal cells can be depicted as color coded objects based on their time bin corresponding to the NADH fluorescence signal.
Figure 3B:
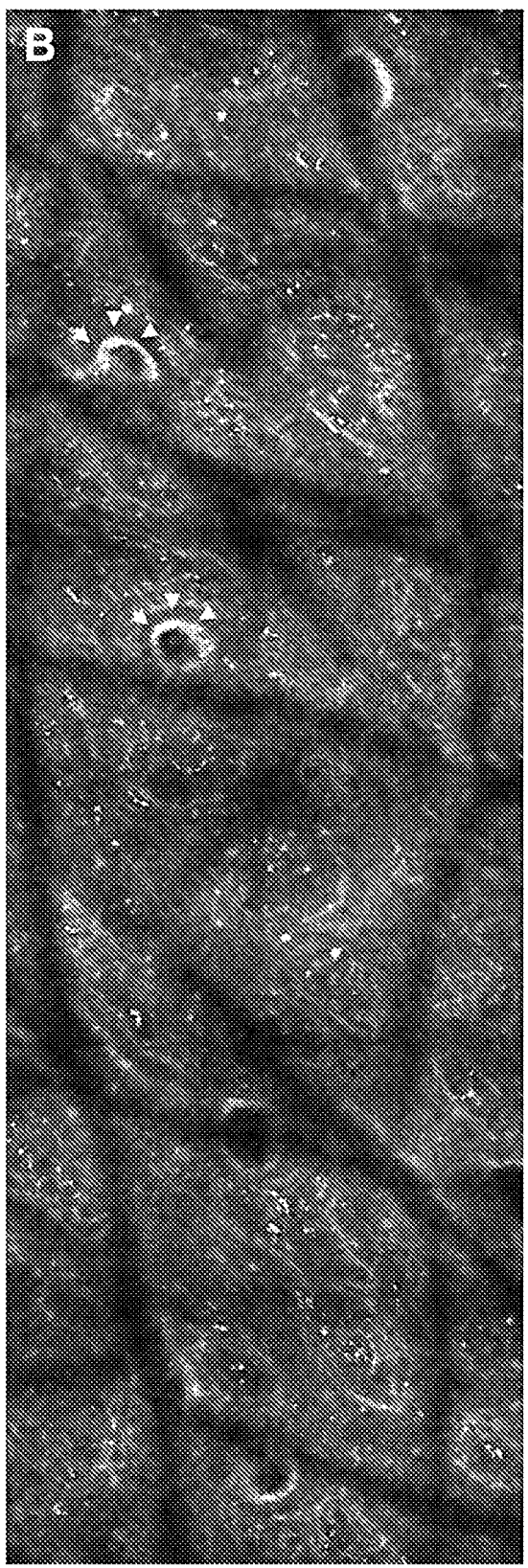
Figure 3C:
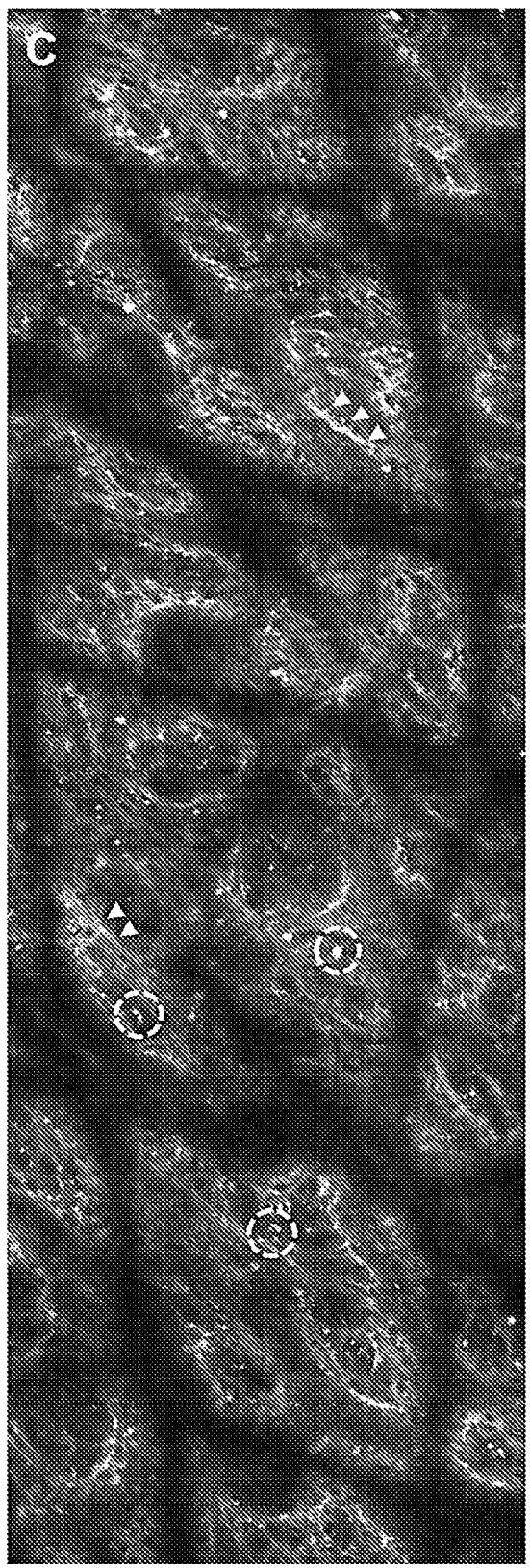
Figure 3D:
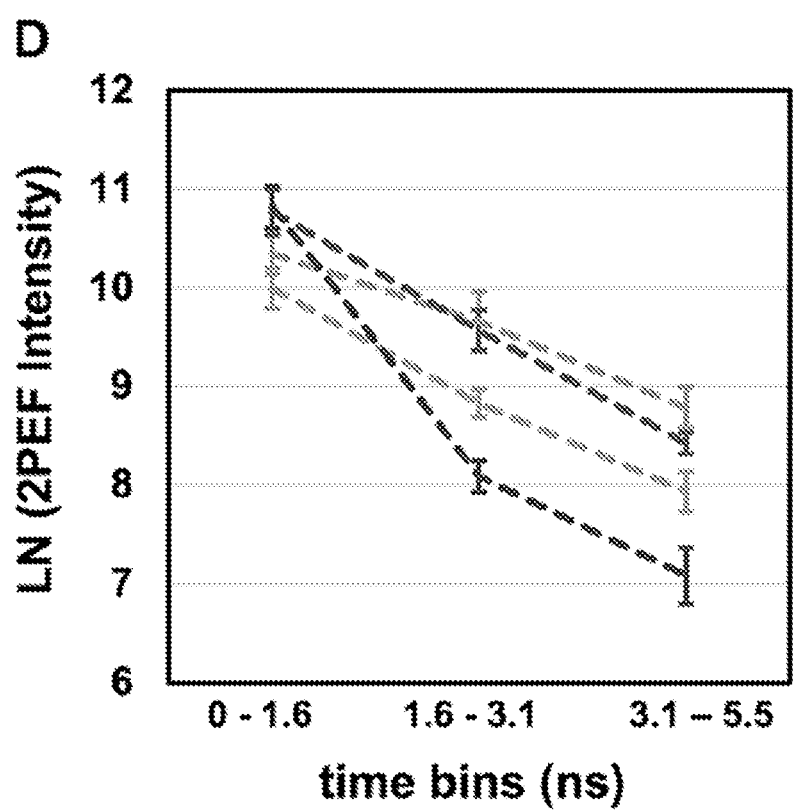
Figure 4A:
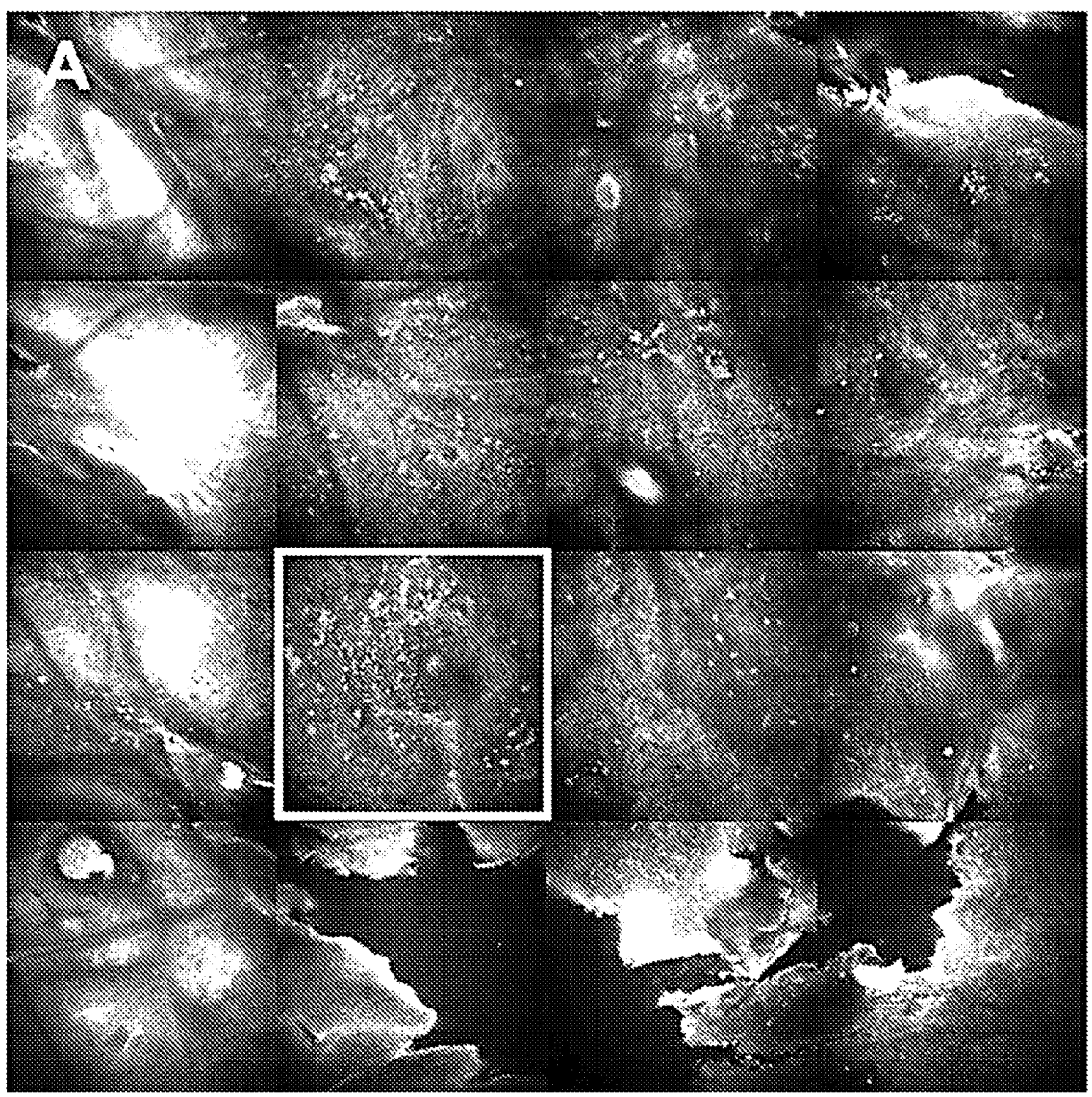
FIG. 4A-F presents FLAME imaging of lymphocytic infiltrates in a melanoma lesion of human skin. (A) Macroscopic image (3 mm×3 mm) acquired in 40 s at 80 μm depth. The image represents the merged image of three detection channels (SHG-blue; TPEF long fluorescence lifetime-green; TPEF-short fluorescence lifetime-red); (B-D) Close-up image of the area delineated in (A) showing melanin-rich tumor cells and probably melanophages detected by melanin short TPEF lifetime (B, red channel, arrows) and lymphocytic infiltrates detected by NADH long TPEF lifetime (C, green channel, dashed circle) surrounded by collagen fibers detected by SHG signal (D, blue channel). (E) Immunohistochemistry image showing lymphocytic infiltrate in the dermis of the melanoma lesion. (F) Immunohistochemistry image showing CD3+ T-cells (dashed circle) in a histologic section of the same lesion.
Figure 4B:
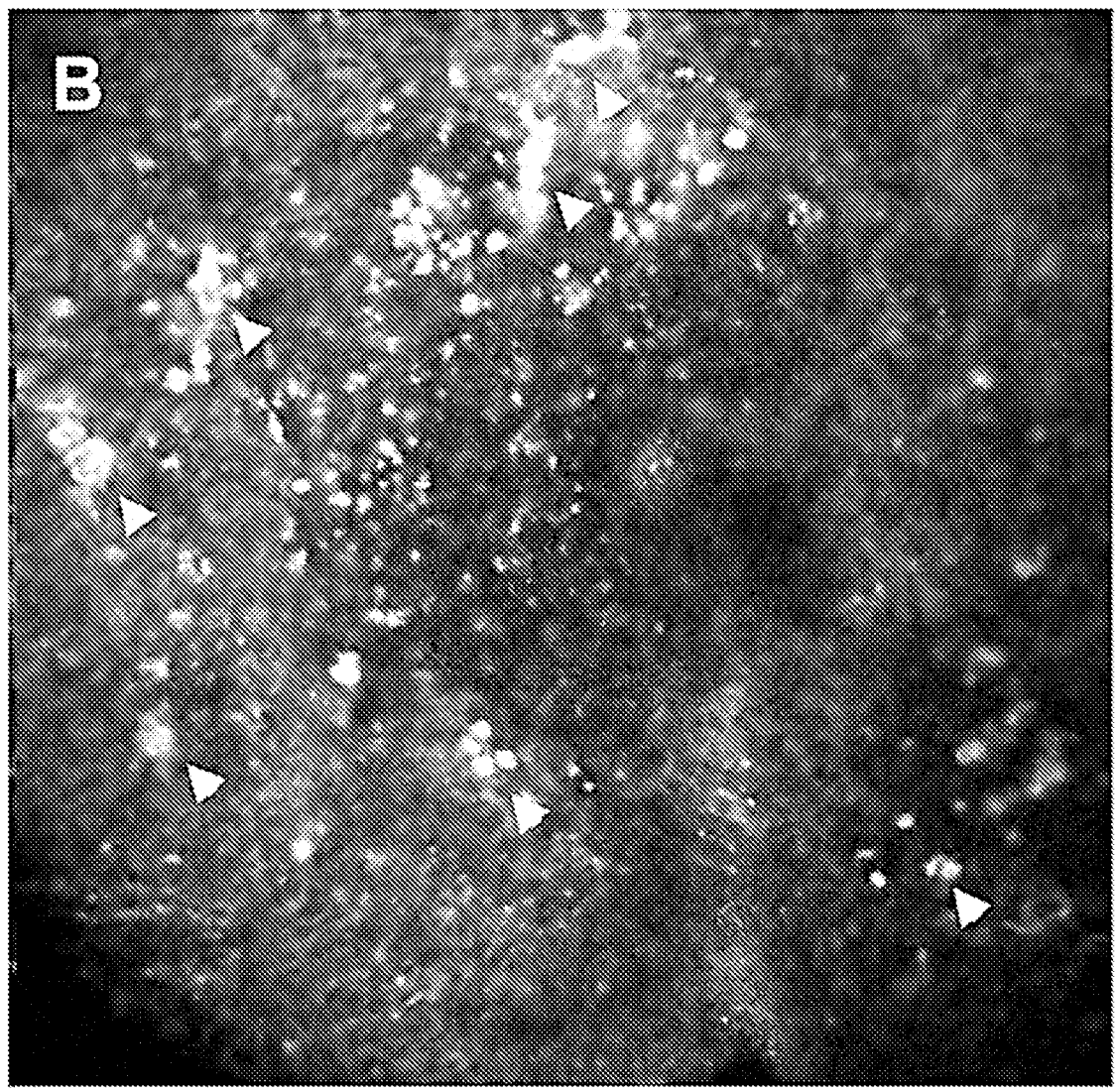
Figure 4C:
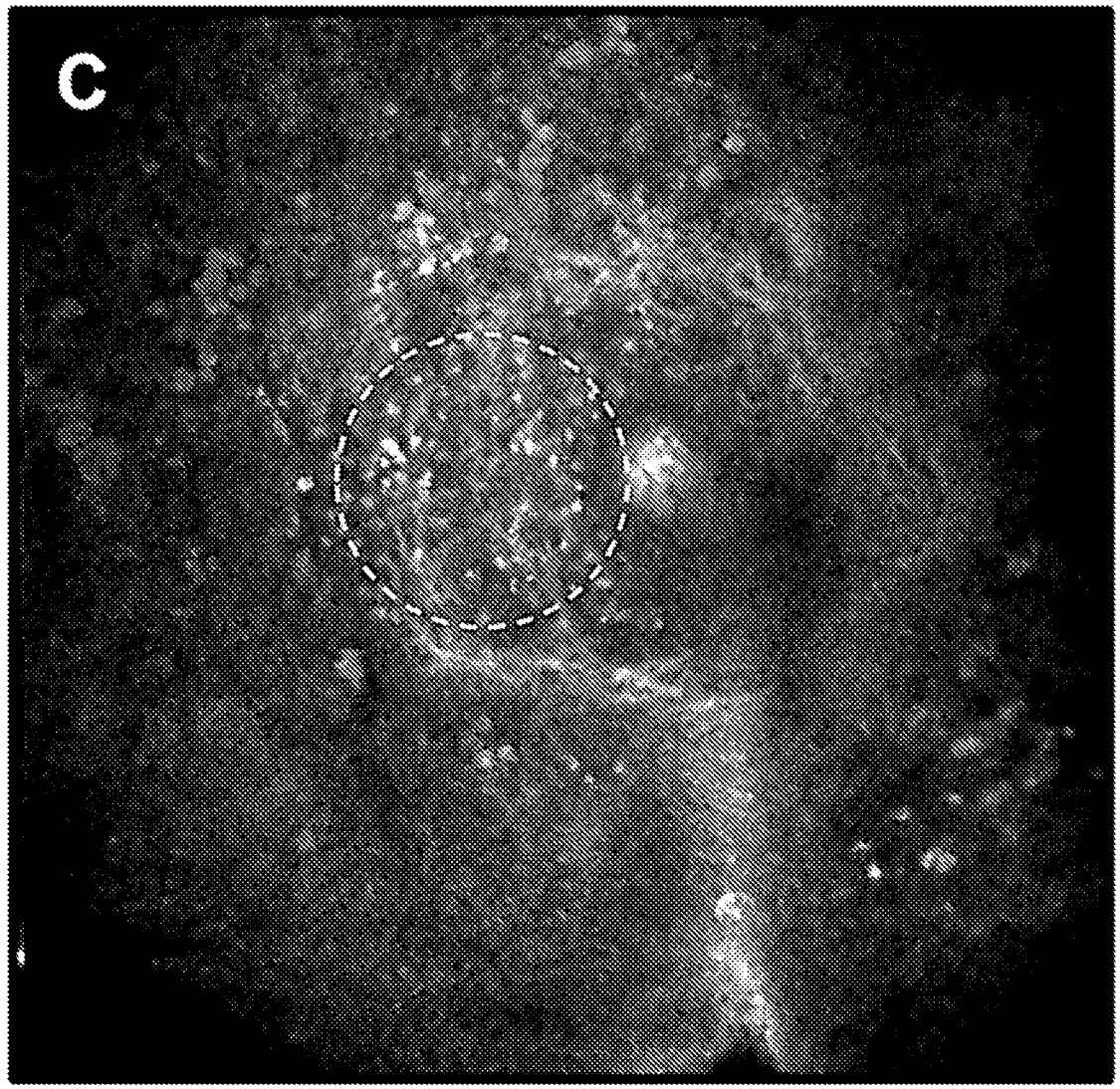
Figure 4D:
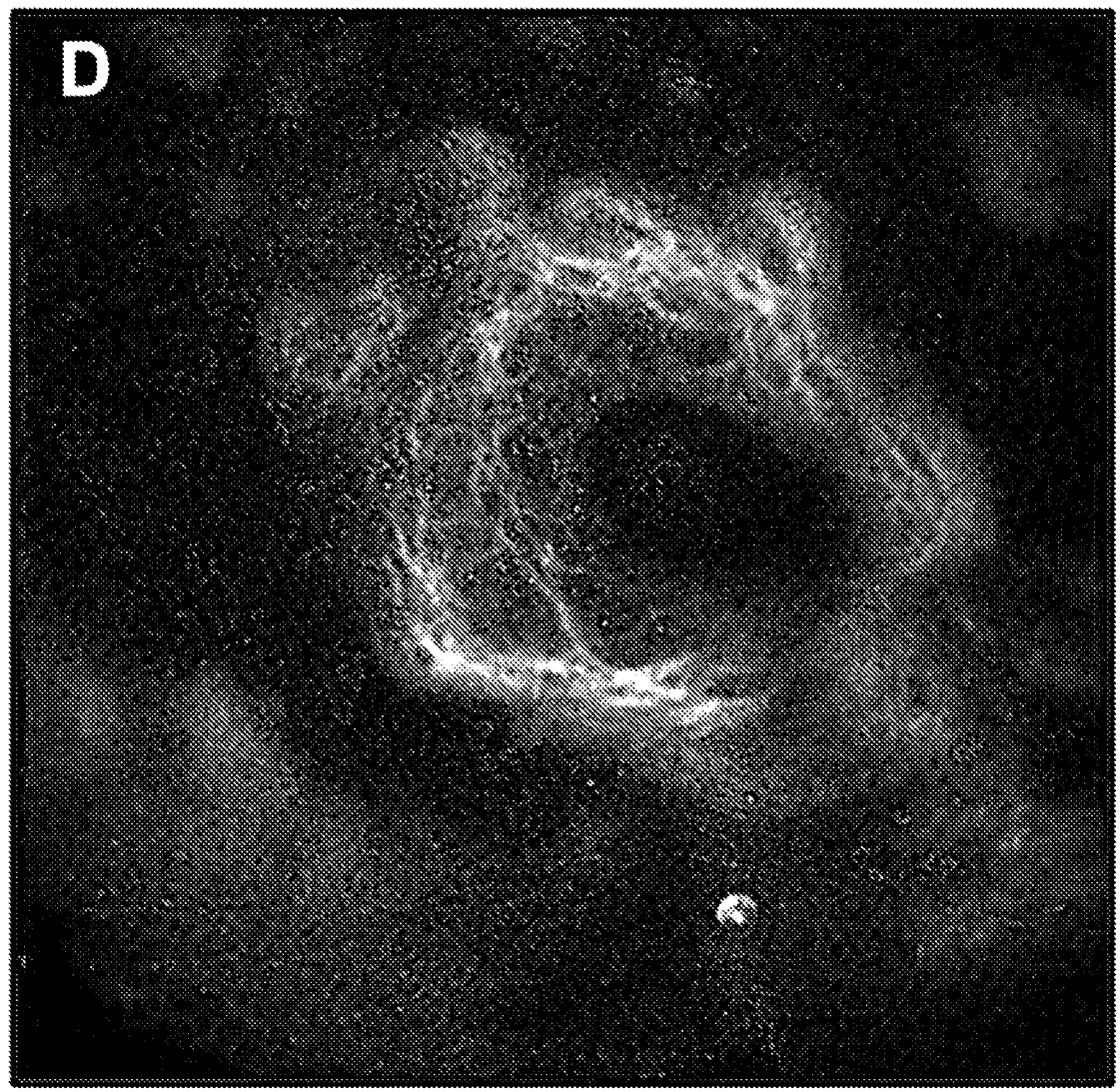
Figure 4E:
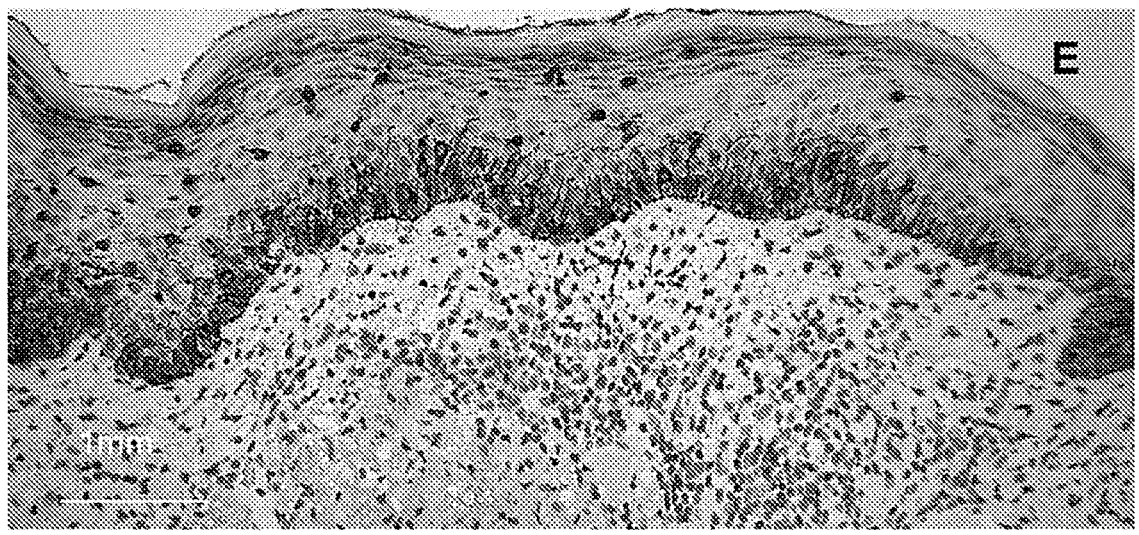
Figure 4F:
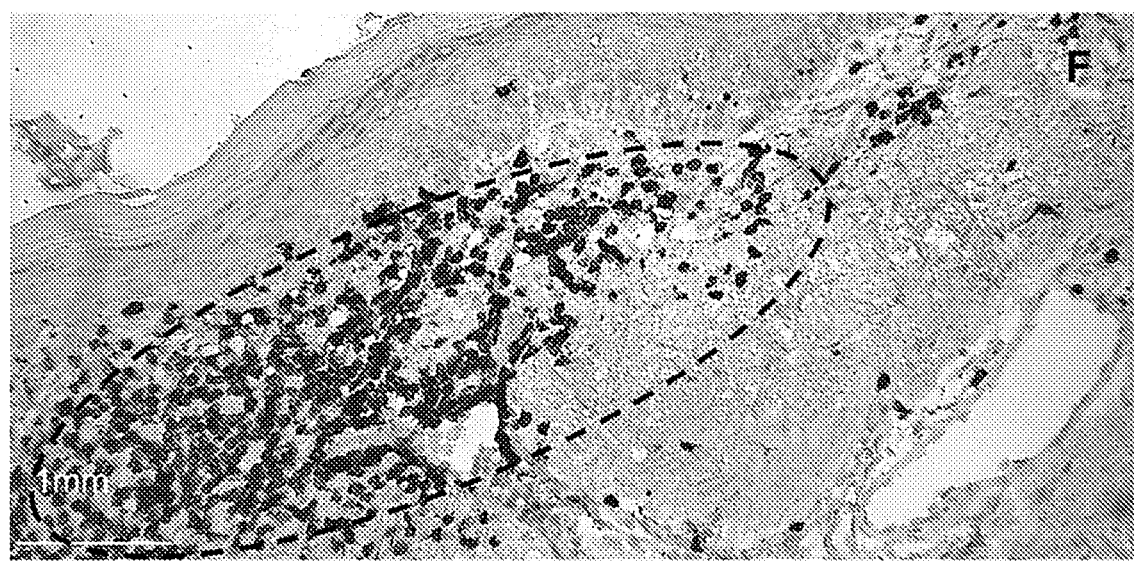
Figure 6A:
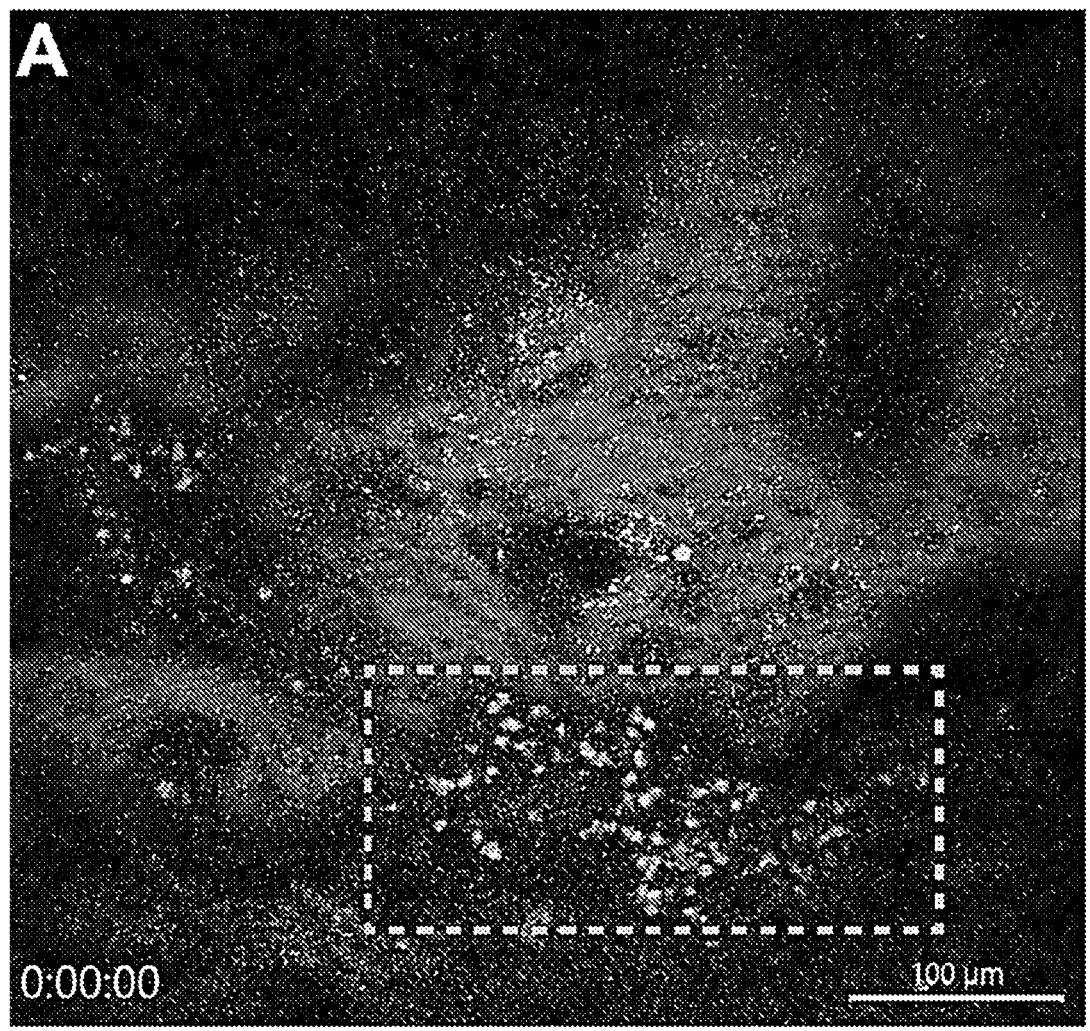
FIG. 6A-C presents in vivo label-free dynamic imaging of immune cells in human skin 2 h post injury. (A) A snapshot of the video captured in vivo by FLAME 2 hours post injury generated in human skin (thigh area) through epidermal removal following suction blistering. (B) The motile cells (dashed outlined area in A) were imaged at the edge of the wound based on the NADH time-resolved two-photon excited fluorescence. Collagen was imaged based on its SHG signal detection. (C) The traces show the positions of the cells in (B) during the duration of the video captured over a 25-minute time period with 1 minute time intervals in between frames. Motile cells speed range: 0.8-1.8 μm/minute.
Figure 6B:
Figure 6C:
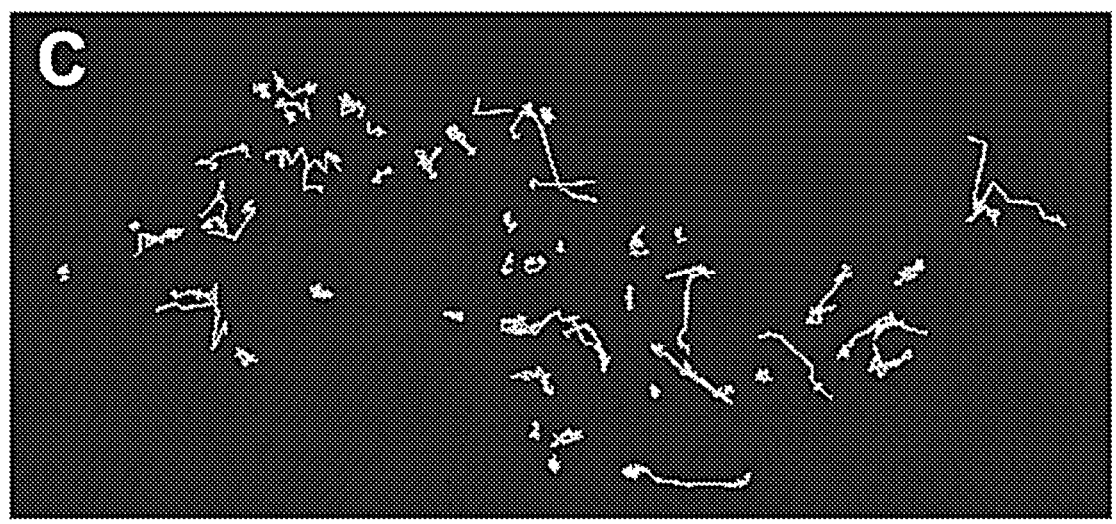

Determining the metabolic signatures of the detected immune cells can be accomplished by temporal binning the decays of fluorescence lifetime signals of one or more endogenous biomolecules (e.g., NADH), and performing slope fluorescence decay analysis. In furtherance of the foregoing, analysis of the detected cells' NADH fluorescence lifetime signals comprise: (1) temporal binning the decays from the available maximum number of time bins to a lower number of time bins by summing up the photons in several consecutive time bins to increase photon budget; and (2) transforming the fluorescence exponential decay into a logarithmic function and applying a linear regression to obtain the slope of the decay. The temporal binning strategy along with the slope analysis can be focused on an immune cell population of interest to allow for maximum number of immune cell populations to be distinguished. An example is provided in FIG. 3D representing the analysis for the image shown in FIG. 3A-C. The fluorescence decays of the cells' NADH were binned in 3-time bins (<1.6 ns, 1.6-3.1 ns and 3.1-5.5 ns) and the data analyzed by transforming the fluorescence exponential decay into a logarithmic function and applying a linear regression to obtain the slope of the decay. Based on the analysis over 20 cells in each cell population, it was found herein the slopes had values between 0.8 and 1.9 (standard deviation between 0.04 to 0.2) and were statistically different ($p<0.05$) when each two cell populations were evaluated under a student t-test assuming equal variances. This method allows for a significantly lower number of detected photons compared to the bi-exponential fitting or the phasor method at the expense of temporal resolution. In another example, it was found that lymphocytic infiltrates (primary T-cells) could be detected in a melanoma lesion of human skin by analyzing images acquired by a nonlinear optical microscopy imaging platform (see FIG. 4). The lymphocytic infiltrates are expected to be distinguished from the melanophages based on their NADH longer fluorescence lifetime compared to the fluorescence lifetime of the melanin in melanophages (see FIG. 4). The presence of lymphocytic infiltrates was validated by H&E and immunohistochemistry staining performed on the same lesion.

In a particular embodiment, the methods and approaches described herein comprise distinguishing various immune cell populations based on their morphological and metabolic signatures by using computational analysis. The workflow described in FIG. 5, provides an example of computational analysis that can be followed. The first step of the analysis involves combining the time bins related to the detected fluorescence lifetime such that the cellular fluorescence can be separated from the elastin fibers fluorescence in the skin dermis. The time bins are combined to generate 3-channel images for detecting the cells as separate objects from the extra-cellular matrix based on their NADH shorter fluorescence lifetime with respect to elastin and longer with respect to the SHG signal from collagen and melanin (see FIG. 5B, step 1). Once the cells are detected, regions of interest (ROI) around the cells' centroids can be selected to increase photon budget for further analysis (see FIG. 5C, step 2). The ROI size should be selected to be comparable to the size of the largest cells of interest. Once the cells were detected, the morphological features (e.g., area, perimeter, shape, etc.) and the metabolic features (e.g., cells' NADH fluorescence lifetime) are extracted for each detected cell (see FIG. 5D, step 3). Morphological features are extracted by using a customized or publicly available software (e.g., Cell Profiler, ImageJ), while metabolic features are determined by using the disclosed fluorescence decay slope analysis as described herein. The final concatenated features across all individual cells are used as input into unsupervised clustering algorithms to isolate separate cell populations (see FIG. 5E, step 4). In addition to the full feature set, dimensionally reduced representations can be considered including those derived from principal components analysis as well as nonlinear unsupervised manifold learning techniques such as t-$ distributed stochastic neighbor embedding (t-SNE) and neural network autoencoders.

In a particular embodiment, the nonlinear optical microscopy imaging platform used in the methods and approaches described herein is a fast, large area multiphoton exoscope (FLAME) imaging platform. A previous generation of the FLAME imaging platform that did not include fluorescence lifetime detection is described in U.S. Ser. No. 10/595,770 B2 and Fast et al., Scientific Reports 10:18093 (2020), the disclosures of which are incorporated herein in full. The advantages of the FLAME imaging platform are many. For example, the FLAME imaging platform can provide label-free dynamic imaging of living immune cells in human skin at the bedside. The FLAME imaging platform can provide information about behavioral features of individual immune cells (their trajectory and mean velocity) during migration. The ability of the FLAME imaging platform to rapidly scan over a large spatial scale is important for the overall assessment of dynamic changes, while the ability to detect cells' NADH fluorescence lifetime can provide insights into metabolic changes during the cell's migration related to various skin conditions. It was found herein that the FLAME imaging platform can capture the dynamics of immune cells in human skin by imaging the cellular immune response during the healing process of a superficial wound in human skin (see FIG. 6). The wound was generated by removing the epidermal roof following a suction blistering procedure. The immune cell migration towards the center of the wound was captured by imaging within the first two hours post injury and was recorded over a time period of 25 minutes (1 minute interval in between frames). The immune cells were visualized by detecting the cells' NADH fluorescence lifetime. In such an embodiment, the computational analysis includes information obtained from dynamic imaging, such as the trajectory and mean velocity of immune cells (behavioral signatures), which is used in conjunction with morphological and metabolic signatures to improve the method's ability to automatically distinguish between different immune cell populations.

In a further embodiment, the methods and approaches disclosed herein can include use of additional imaging modalities such as RCM, optical coherence tomography (OCT) or photoacoustic imaging for enhancing the imaging sources of contrast and the discriminating power of the approach.

The methods and approaches disclosed herein are particularly suited for clinical skin imaging, in general, and for diagnosis and monitoring therapy for skin disorders or conditions in a subject suspected or having a skin disorder or disease. In a certain embodiment, the skin disease or disorder is selected from skin cancer, autoimmune skin disorders, skin infections, cold sore, hives, actinic keratosis, rosacea, latex allergy, eczema, psoriasis, measles, contact dermatitis, chickenpox, seborrheic eczema, keratosis pilaris, and impetigo. In a further embodiment, the skin cancer is selected from melanoma, basal cell cancer, squamous cell carcinoma. In yet a further embodiment, the autoimmune skin disorder is selected from Behcet's disease, dermatitis herpetiformis, dermatomyositis, lichen planus, linear IgA disease, lupus of the skin, morphea/scleroderma, ocular cicatricial pemphigoid, pemphigoid, pemphigus, and vasculitis. In another embodiment, the skin infection is selected from acne, boils, carbuncle, warts, ringworm, and cellulitis. In yet another embodiment, the method quantitates or monitors the molecular characteristics of T cells, melanophages, macrophages and/or any other immune cells in the region of skin from the subject. In a further embodiment, the method can detect activated T-cells and/or any other immune cells in the region of skin.

Examples of skin disorders and conditions, include but are not limited to, skin cancer, such as melanoma, basal cell cancer, squamous cell carcinoma; autoimmune skin disorders, such as Behcet's disease, dermatitis herpetiformis, dermatomyositis, lichen planus, linear IgA disease, lupus of the skin, morphea/scleroderma, ocular cicatricial pemphigoid, pemphigoid, pemphigus, and vasculitis; skin infections, including acne, boils, carbuncle, warts, ringworm, and cellulitis; cold sore; hives; actinic keratosis; rosacea; latex allergy; eczema; psoriasis; measles; contact dermatitis; chickenpox; seborrheic eczema; keratosis pilaris; and impetigo. In a particular embodiment, the skin disorder or disease is skin cancer.

In a particular embodiment, the disclosure also provides a method for evaluating and/or monitoring the effectiveness of a therapy or therapies in stimulating or, alternatively, suppressing an immune response in a skin lesion or skin affected by side effects of therapy, including immunotherapy of any cancer, the method comprising: imaging the immune response in a skin lesion or skin affected by side effects of therapy from a subject with a nonlinear optical microscopy device enhanced with fluorescence lifetime detection and analysis approaches described in this disclosure, alone or in combination with other imaging modalities, administering a therapy or therapies to the subject; imaging the immune response skin lesion or in skin affected by side effects of therapy from the subject with the portable multiphoton imaging system at one or more time points after the administration of a therapy or therapies to the subject; evaluating the imaging before and after the administration of a therapy or therapies in order to evaluate or monitor the effectiveness of the therapy or therapies in stimulating or, alternatively, suppressing an immune response in the skin lesion or the skin affected by side effects of therapy. In a further embodiment, the skin lesion or skin affected by side effects of therapy is associated with a skin disorder or disease. In yet a further embodiment, the skin disease or disorder is selected from skin cancer, autoimmune skin disorders, skin infections, cold sore, hives, actinic keratosis, rosacea, latex allergy, eczema, psoriasis, measles, contact dermatitis, chickenpox, seborrheic eczema, keratosis pilaris, and impetigo. In another embodiment, the skin cancer is selected from melanoma, basal cell cancer, squamous cell carcinoma. In yet another embodiment, the autoimmune skin disorder is selected from Behcet's disease, dermatitis herpetiformis, dermatomyositis, lichen planus, linear IgA disease, lupus of the skin, morphea/scleroderma, ocular cicatricial pemphigoid, pemphigoid, pemphigus, and vasculitis. In a further embodiment, the skin infection is selected from acne, boils, carbuncle, warts, ringworm, and cellulitis. In another embodiment, the method quantitates or monitors the molecular characteristics of T cells, melanophages, and/or macrophages in the skin lesion or skin affected by side effects of therapy. In yet another embodiment, the method is capable of detecting activated T-cells in the skin lesion or skin affected by side effects of therapy. In a further embodiment, the therapy or therapies are immunotherapies. In yet a further embodiment, the immunotherapies are selected from pembrolizumab, nivolumab, cemiplimab, atezolizumab, avelumab, durvalumab, ipilimumab, tisotumab vedotin-tftv, tisagenlecleucel, axicabtagene, ciloleucel, and blinatumomab.

For assessing the immune system activation in the context of inflammatory disease or cancer immunotherapy, the methods and approaches disclosed herein can determine the immune response in lesional skin or skin that does not have an obvious reaction. Examples include, but are not limited to, (1) skin immune disease applications, e.g., imaging the immune response in early-stage lesions to detect when the immune response is initiating or when lesions are progressing; (2) skin therapy monitoring, e.g., measuring how therapies change the immune response in the skin as a way to identify therapies that are effective or when they stop working; and (3) cancer immunotherapy monitoring, detecting brisk T cell skin responses that could correlate with responses that can be observed in the tumor, whether the tumor is in the skin or is in another organ.

The disclosure further provides that the methods described herein can be further defined by the following aspects (aspects 1 to 53):

1. A noninvasive method for the in vivo identification and characterization of various immune cell populations in human skin, comprising
   imaging a region of human skin from a subject to detect immune cells noninvasively by using a nonlinear optical imaging system that generates depth-resolved images over large areas with sub-micron resolution based on fluorescence signals generated from one or more endogenous biomolecules found in human skin, wherein one of the endogenous biomolecules is the reduced form of nicotinamide adenine dinucleotide (NADH);
   analyzing the image(s) generated from the nonlinear optical imaging system to retrieve information about the metabolic signatures of the detected immune cells by temporal binning the decays of fluorescence lifetime signals of the one or more endogenous biomolecules, and performing slope fluorescence decay analysis; and
   distinguishing various immune cell populations based on their morphological and metabolic signatures by using computational analysis.
2. The method of aspect 1, wherein the nonlinear optical imaging system is a fast, large area multiphoton exoscope (FLAME)-based imaging system.
3. The method of aspect 1 or aspect 2, wherein the nonlinear optical imaging system generates depth-resolved images from areas that are at least $0.5 \times 0.5$ mm$^2$.
4. The method of aspect 3, wherein the nonlinear optical imaging system generates depth-resolved images from the region of skin having an area of $0.5 \times 0.5$ mm$^2$, $0.6 \times 0.6$ mm$^2$, $0.7 \times 0.7$ mm$^2$, $0.8 \times 0.8$ mm$^2$, $0.9 \times 0.9$ mm$^2$, $1.0 \times 1.0$ mm$^2$, $1.1 \times 1.1$ mm$^2$, $1.2 \times 1.2$ mm$^2$, $1.3 \times 1.3$ mm$^2$, $1.4 \times 1.4$ mm$^2$, $1.5 \times 1.5$ mm$^2$, $1.6 \times 1.6$ mm$^2$, $1.7 \times 1.7$ mm$^2$, $1.8 \times 1.8$ mm$^2$, $1.9 \times 1.9$ mm$^2$, $2.0 \times 2.0$ mm$^2$, $2.2 \times 2.2$ mm$^2$, $2.4 \times 2.4$ mm$^2$, $2.6 \times 2.6$ mm$^2$, $2.8 \times 2.8$ mm$^2$, $3.0 \times 3.0$ mm$^2$, $3.5 \times 3.5$ mm$^2$, $4.0 \times 4.0$ mm$^2$, $4.5 \times 4.5$ mm$^2$, $5.0 \times 5.0$ mm$^2$, $5.5 \times 5.5$ mm$^2$, $6.0 \times 6.0$ mm$^2$, $6.5 \times 6.5$ mm$^2$, $7.0 \times 7.0$ mm$^2$, $7.5 \times 7.5$ mm$^2$, $8.0 \times 8.0$ mm$^2$, $8.5 \times 8.5$ mm$^2$, $9.0 \times 9.0$ mm$^2$, $9.5 \times 9.5$ mm$^2$, $10.0 \times 10.0$ mm$^2$, $11.0 \times 11.0$ mm$^2$, $12.0 \times 12.0$ mm$^2$, $13.0 \times 13.0$ mm$^2$, $14.0 \times 14.0$ mm$^2$, $15.0 \times 15.0$ mm$^2$, 20.0×20.0 mm², 30.0×30.0 mm², 40.0×40.0 mm², 50.0×50.0 mm², 60.0×60.0 mm², 70.0×70.0 mm², 80.0×80.0 mm², 90.0×90.0 mm², or 100.0×100.0 mm² or a range that includes or is in between any two of the foregoing area sizes, including fractional increments thereof.
5. The method of any one of the preceding aspects, wherein the nonlinear optical imaging system is used in combination with other imaging modalities selected from RCM, OCT and/or photoacoustic imaging.
6. The method of any one of the preceding aspects, wherein the fluorescence lifetime signals are temporally resolved based upon the detection of the arrival time of fluorescence photons by a detector of the nonlinear optical imaging system.
7. The method of aspect 6, wherein the analog output of the detector is digitized at a rate of at least 1.5 GHz.
8. The method of aspect 6 or aspect 7, wherein a clock multiplier board multiples the excitation laser repetition rate of the nonlinear optical imaging system by a factor of at least 16.
9. The method of any one of the preceding aspects, wherein the endogenous biomolecules comprise NADH and one or more of the following endogenous biomolecules: $FAD^+$, elastin, melanin, collagen, and/or keratin.
10. The method of any one of the preceding aspects, wherein the nonlinear optical imaging system is used for dynamic imaging of the immune response in human skin based on endogenous molecular contrast.
11. The method of aspect 10, wherein the endogenous molecular contrast is generated from second-harmonic generation (SHG) from collagen and two-photon excited fluorescence (TPEF) intensity signals from elastin, $NADH/FAD^+$, melanin, and/or keratin.
12. The method of any one of the preceding aspects, wherein the images acquired by the nonlinear optical imaging system comprise detecting a TPEF signal from the endogenous biomolecules in x number of time bins at an effective rate of 2 sec/frame, wherein x is an integer is selected from 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 100, 110, 120, 130, 140, 150, 160, 170, 180, 190, 200, 210, 220, 230, 240, 250, and 256 or is a range that includes or is in between any two of the foregoing numbers.
13. The method of any one of the preceding aspects, wherein the immune cell's NADH fluorescence is detected in x number of time bins using excitation from an 80 MHz laser, wherein x is an integer is selected from 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 100, 110, 120, 130, 140, 150, 160, 170, 180, 190, 200, 210, 220, 230, 240, 250, and 256 or is a range that includes or is in between any two of the foregoing numbers.
14. The method of any one of the preceding aspects, wherein the image(s) generated from the nonlinear optical imaging system are analyzed for immune cells' NADH fluorescence lifetime signals by:
   (1) temporal binning the decays from the available maximum number of time bins to a lower number of time bins by summing up the photons in several consecutive time bins to increase photon budget; and
   (2) transforming the fluorescence exponential decay into a logarithmic function and applying a linear regression to obtain the slope of the decay.
15. The method of any one of the preceding aspects, wherein the computational analysis automatically distinguishes various immune cell populations based on their morphological, metabolic and behavioral signatures.
16. The method of any one of the preceding aspects, wherein the computational analysis comprises the steps of:
   (a) combining the time bins related to the detected fluorescence lifetime to generate 3-channel images to detect the cells as separate objects from the extra-cellular matrix;
   (b) selecting regions of interest (ROI) around the detected cells centroids, wherein the ROI size should be comparable to the size of the largest immune cell of interest;
   (c) extracting for each detected cell the morphological and metabolic features; and
   (d) isolating separate cell populations using an unsupervised clustering algorithm.
17. The method of aspect 16, wherein step (a), cells can be detected from the extra-cellular matrix based upon NADH having a characteristic fluorescence lifetime in comparison to the fluorescence lifetime signals from other endogenous biomolecules.
18. The method of aspect 17, wherein the other endogenous biomolecules include elastin, collagen and melanin.
19. The method of any one of aspects 16 to 18, wherein for step (c), the morphological features are selected from area, perimeter, and/or shape; and wherein the metabolic features are the cell's NADH fluorescence lifetime.
20. The method of any one of aspects 16 to 19, wherein for step (d), wherein the input of the unsupervised clustering algorithm is generated by concatenating the morphological and metabolic features across all individual cells.
21. The method of any one of the preceding aspects, wherein the region of the skin from the subject is from normal skin or comprises a skin lesion.
22. The method of any one of the preceding aspects, wherein the subject has or is suspected of having a skin disorder or disease.
23. The method of aspect 22, wherein the skin disease or disorder is selected from skin cancer, autoimmune skin disorders, skin infections, cold sore, hives, actinic keratosis, rosacea, latex allergy, eczema, psoriasis, measles, contact dermatitis, chickenpox, seborrheic eczema, keratosis pilaris, and impetigo.
24. The method of aspect 23, wherein the skin cancer is selected from melanoma, basal cell carcinoma, squamous cell carcinoma.
25. The method of aspect 23, wherein the autoimmune skin disorder is selected from Behcet's disease, dermatitis herpetiformis, dermatomyositis, lichen planus, linear IgA disease, lupus of the skin, morphea/scleroderma, ocular cicatricial pemphigoid, pemphigoid, pemphigus, and vasculitis.
26. The method of aspect 23, wherein the skin infection is selected from acne, boils, carbuncle, warts, ringworm, and cellulitis.
27. The method of any one of the preceding aspects, wherein the method quantitates or monitors the molecular characteristics of T cells, melanophages, macrophages and/or any other immune cells in the region of skin from the subject.

28. The method of any one of the preceding aspects, wherein the method detects activated T-cells in the region of skin.

29. A method for evaluating and/or monitoring the effectiveness of a therapy or therapies in stimulating or, alternatively, suppressing an immune response in a skin lesion, comprising
   (1) imaging a skin lesion from a subject by using a nonlinear optical imaging system that comprises a fast, large area multiphoton exoscope (FLAME) device or an imaging platform with similar performance, alone or in combination with other imaging modalities;
   (2) administering one or more therapies to the subject;
   (3) imaging the skin lesion from a subject by using a nonlinear optical imaging system that comprises the FLAME device or the imaging platform with similar performance, alone or in combination with other imaging modalities; and
   (4) comparing the images of the skin lesion before and after the administration of the one or more therapies to the subject to evaluate or monitor the effectiveness of the therapy or therapies in stimulating or, alternatively, suppressing an immune response in the skin lesion.

30. The method of aspect 29, wherein the other imaging modalities are RCM and/or OCT and/or photoacoustic imaging.

31. The method of aspect 29 or aspect 30, wherein the skin lesion or skin affected by side effects of therapy is associated with a skin disorder or disease.

32. The method of any one of aspects 29 to 31, wherein the skin disorder or disease selected from skin cancer, autoimmune skin disorders, skin infections, cold sore, hives, actinic keratosis, rosacea, latex allergy, eczema, psoriasis, measles, contact dermatitis, chickenpox, seborrheic eczema, keratosis pilaris, and impetigo.

33. The method of aspect 32, wherein the skin cancer is selected from melanoma, basal cell cancer, squamous cell carcinoma.

34. The method of aspect 32, wherein the autoimmune skin disorder is selected from Behcet's disease, dermatitis herpetiformis, dermatomyositis, lichen planus, linear IgA disease, lupus of the skin, morphea/scleroderma, ocular cicatricial pemphigoid, pemphigoid, pemphigus, and vasculitis.

35. The method of aspect 32, wherein the skin infection is selected from acne, boils, carbuncle, warts, ringworm, and cellulitis.

36. The method of any one of aspects 29 to 35, wherein the method quantitates or monitors the molecular characteristics of T cells, melanophages, and/or macrophages in the skin lesion or skin affected by side effects of therapy.

37. The method of any one of aspects 29 to 36, wherein the method detects activated T-cells in the skin lesion or skin affected by side effects of therapy.

38. The method of any one of aspects 29 to 37, wherein the one or more therapies are immunotherapies.

39. The method of aspect 38, wherein the immunotherapies are selected from pembrolizumab, nivolumab, cemiplimab, atezolizumab, avelumab, durvalumab, ipilimumab, tisotumab vedotin-tftv, tisagenlecleucel, axicabtagene ciloleucel, and blinatumomab.

40. The method of any one of aspects 29 to 39, wherein the FLAME device, or an imaging platform with similar performance, generates depth-resolved images over large areas with sub-micron resolution based on fluorescence signals generated from one or more endogenous biomolecules found in human skin, wherein one of the endogenous biomolecules is the reduced form of nicotinamide adenine dinucleotide (NADH).

41. The method of any one of aspects 29 to 40, wherein the images generated from the FLAME device, or an imaging platform with similar performance, generates depth-resolved images from areas that are at least $0.5 \times 0.5$ mm$^2$.

42. The method of aspect 40, wherein the images generated from the FLAME device, or an imaging platform with similar performance, generates depth-resolved images from the region of skin having an area of $0.5 \times 0.5$ mm$^2$, $0.6 \times 0.6$ mm$^2$, $0.7 \times 0.7$ mm$^2$, $0.8 \times 0.8$ mm$^2$, $0.9 \times 0.09$ mm$^2$, $1.0 \times 1.0$ mm$^2$, $1.1 \times 1.1$ mm$^2$, $1.2 \times 1.2$ mm$^2$, $1.3 \times 1.3$ mm$^2$, $1.4 \times 1.4$ mm$^2$, $1.5 \times 1.5$ mm$^2$, $1.6 \times 1.6$ mm$^2$, $1.7 \times 1.7$ mm$^2$, $1.8 \times 1.8$ mm$^2$, $1.9 \times 1.9$ mm$^2$, $2.0 \times 2.0$ mm$^2$, $2.2 \times 2.2$ mm$^2$, $2.4 \times 2.4$ mm$^2$, $2.6 \times 2.6$ mm$^2$, $2.8 \times 2.8$ mm$^2$, $3.0 \times 3.0$ mm$^2$, $3.5 \times 3.5$ mm$^2$, $4.0 \times 4.0$ mm$^2$, $4.5 \times 4.5$ mm$^2$, $5.0 \times 5.0$ mm$^2$, $5.5 \times 5.5$ mm$^2$, $6.0 \times 6.0$ mm$^2$, $6.5 \times 6.5$ mm$^2$, $7.0 \times 7.0$ mm$^2$, $7.5 \times 7.5$ mm$^2$, $8.0 \times 8.0$ mm$^2$, $8.5 \times 8.5$ mm$^2$, $9.0 \times 9.0$ mm$^2$, $9.5 \times 9.5$ mm$^2$, $10.0 \times 10.0$ mm$^2$, $11.0 \times 11.0$ mm$^2$, $12.0 \times 12.0$ mm$^2$, $13.0 \times 13.0$ mm$^2$, $14.0 \times 14.0$ mm$^2$, $15.0 \times 15.0$ mm$^2$, $20.0 \times 20.0$ mm$^2$, $30.0 \times 30.0$ mm$^2$, $40.0 \times 40.0$ mm$^2$, $50.0 \times 50.0$ mm$^2$, $60.0 \times 60.0$ mm$^2$, $70.0 \times 70.0$ mm$^2$, $80.0 \times 80.0$ mm$^2$, $90.0 \times 90.0$ mm$^2$, or $100.0 \times 100.0$ mm$^2$ or a range that includes or is in between any two of the foregoing area sizes, including fractional increments thereof.

43. The method of any one of aspects 40 to 42, wherein the endogenous biomolecules comprise NADH and one or more of the following endogenous biomolecules: FAD$^+$, elastin, melanin, collagen, and/or keratin.

44. The method of any one of aspects 40 to 43, wherein the FLAME device, or an imaging platform with similar performance, is used for dynamic imaging of the immune response in human skin based on endogenous molecular contrast.

45. The method of aspect 44, wherein the endogenous molecular contrast is generated from second-harmonic generation (SHG) from collagen and two-photon excited fluorescence (TPEF) intensity signals from elastin, NADH/FAD$^+$, melanin, and/or keratin.

46. The method of any one of aspects 40 to 45, wherein the images generated by the FLAME device, or an imaging platform with similar performance, comprise detecting a TPEF signal from the endogenous biomolecules in x number of time bins at an effective rate of 2 sec/frame, wherein x is an integer is selected from 5, 6, 7, 8, 9, 10, 11, 12, 13, 14, 16, 17, 18, 19, 20, 21, 22, 23, 24, 25, 26, 27, 28, 29, 40, 50, 60, 70, 80, 90, 100, 110, 120, 130, 140, 150, 160, 170, 180, 190, 200, 210, 220, 230, 240, 250, and 256 or is a range that includes or is in between any two of the foregoing numbers.

47. The method of any one of aspects 40 to 46, wherein the immune cell's NADH fluorescence is detected in x number of time bins using excitation from an 80 MHz laser, wherein x is an integer is selected from 5, 6, 7, 8, 9, 10, 11, 12, 13, 14, 16, 17, 18, 19, 20, 21, 22, 23, 24, 25, 26, 27, 28, 29, 40, 50, 60, 70, 80, 90, 100, 110, 120, 130, 140, 150, 160, 170, 180, 190, 200, 210, 220, 230, 240, 250, and 256 or is a range that includes or is in between any two of the foregoing numbers.

48. The method of any one of aspects 40 to 47, wherein the image(s) generated by the FLAME device, or an imaging platform with similar performance, are analyzed to retrieve information about the metabolic signatures of the detected immune cells by temporal binning the decays of fluorescence lifetime signals of the one or more endogenous biomolecules, and performing slope fluorescence decay analysis; and various immune cell populations are distinguished based on their morphological and metabolic and signatures by using computational analysis.

49. The method of aspect 48, wherein the computational analysis comprises the steps of:
    (a) combining the time bins related to the detected fluorescence lifetime to generate 3-channel images to detect the cells as separate objects from the extra-cellular matrix;
    (b) selecting regions of interest (ROI) around the detected cells centroids, wherein the ROI size should be comparable to the size of the largest immune cell of interest;
    (c) extracting for each detected cell the morphological and metabolic features; and
    (d) isolating separate cell populations using an unsupervised clustering algorithm.
50. The method of aspect 49, wherein step (a), cells can be detected from the extra-cellular matrix based upon NADH having a characteristic fluorescence lifetime in comparison to the fluorescence lifetime signals from other endogenous biomolecules.
51. The method of aspect 50, wherein the other endogenous biomolecules include elastin, collagen and melanin.
52. The method of any one of aspects 49 to 51, wherein for step (c), the morphological features are selected from area, perimeter, and/or shape; and wherein the metabolic features are the cell's NADH fluorescence lifetime.
53. The method of any one of aspects 49 to 52, wherein for step (d), wherein the input of the unsupervised clustering algorithm is generated by concatenating the morphological and metabolic features across all individual cells.

A number of embodiments have been described herein. Nevertheless, it will be understood that various modifications may be made without departing from the spirit and scope of this disclosure. Accordingly, other embodiments are within the scope of the following claims.

What is claimed is:

1. A noninvasive method for the in vivo identification and characterization of various immune cell populations in human skin, comprising:
    imaging a region of human skin from a subject to detect immune cells noninvasively by using a nonlinear optical imaging system that generates depth-resolved images over large areas with sub-micron resolution based on fluorescence signals generated from one or more endogenous biomolecules found in human skin, wherein one of the endogenous biomolecules is the reduced form of nicotinamide adenine dinucleotide (NADH);
    analyzing the image(s) generated from the nonlinear optical imaging system to retrieve information about the metabolic signatures of the detected immune cells by temporal binning the decays of fluorescence lifetime signals of the one or more endogenous biomolecules, and performing slope fluorescence decay analysis; and distinguishing various immune cell populations based on their morphological and metabolic signatures by using computational analysis.

2. The method of claim 1, wherein the nonlinear optical imaging system is a fast, large area multiphoton exoscope (FLAME)-based imaging system.

3. The method of claim 1, wherein the nonlinear optical imaging system is used in combination with other imaging modalities selected from reflectance confocal microscopy (RCM), optical coherence tomography (OCT) and/or photoacoustic imaging.

4. The method of claim 1, wherein the nonlinear optical imaging system is used for dynamic imaging of the immune response in human skin based on endogenous molecular contrast.

5. The method of claim 1, wherein the computational analysis automatically distinguishes various immune cell populations based on their morphological, metabolic and behavioral signatures.

6. The method of claim 1, wherein the subject has or is suspected of having a skin disorder or disease.

7. The method of claim 6, wherein the skin disease or disorder is selected from skin cancer, autoimmune skin disorders, skin infections, cold sore, hives, actinic keratosis, rosacea, latex allergy, eczema, psoriasis, measles, contact dermatitis, chickenpox, seborrheic eczema, keratosis pilaris, and impetigo.

8. The method of claim 7, wherein the autoimmune skin disorder is selected from Behcet's disease, dermatitis herpetiformis, dermatomyositis, lichen planus, linear IgA disease, lupus of the skin, morphea/scleroderma, ocular cicatricial pemphigoid, pemphigoid, pemphigus, and vasculitis.

9. The method of claim 7, wherein the skin infection is selected from acne, boils, carbuncle, warts, ringworm, and cellulitis.

10. The method of claim 1, wherein the method quantitates or monitors the molecular characteristics of T cells, melanophages, macrophages and/or any other immune cells in the region of skin from the subject.

11. The method of claim 1, wherein the method detects activated T-cells in the region of human skin.

12. A in vivo method for evaluating and/or monitoring the effectiveness of a therapy or therapies in stimulating or, alternatively, suppressing an immune response in a skin lesion, comprising:
    (1) imaging a skin lesion from a subject by using a nonlinear optical imaging system that comprises a fast, large area multiphoton exoscope (FLAME) device or an imaging platform with similar performance, alone or in combination with other imaging modalities;
    (2) administering one or more therapies to the subject;
    (3) imaging the skin lesion from a subject by using a nonlinear optical imaging system that comprises the FLAME device or the imaging platform with similar performance, alone or in combination with other imaging modalities; and
    (4) comparing the images of the skin lesion before and after the administration of the one or more therapies to the subject to evaluate or monitor the effectiveness of the therapy or therapies in stimulating or, alternatively, suppressing an immune response in the skin lesion,
    wherein the nonlinear optical imaging system generates depth-resolved images over large areas with sub-micron resolution based on fluorescence signals generated from one or more endogenous biomolecules found in human skin, wherein one of the endogenous biomolecules includes the reduced form of nicotinamide adenine dinucleotide (NADH), and/or flavin adenine dinucleotide (FAD).

13. The method of claim 12, wherein the other imaging modalities are RCM and/or OCT and/or photoacoustic imaging.

14. The method of claim 12, wherein the skin lesion is associated with a skin disorder or disease selected from skin cancer, autoimmune skin disorders, skin infections, cold sore, hives, actinic keratosis, rosacea, latex allergy, eczema, psoriasis, measles, contact dermatitis, chickenpox, seborrheic eczema, keratosis pilaris, and impetigo.

15. The method of claim 14, wherein the autoimmune skin disorder is selected from Behcet's disease, dermatitis herpetiformis, dermatomyositis, lichen planus, linear IgA disease, lupus of the skin, morphea/scleroderma, ocular cicatricial pemphigoid, pemphigoid, pemphigus, and vasculitis.

16. The method of claim 14, wherein the skin infection is selected from acne, boils, carbuncle, warts, ringworm, and cellulitis.

17. The method of claim 12, wherein the method quantitates or monitors the molecular characteristics of T cells, melanophages, and/or macrophages in the skin lesion.

18. The method of claim 12, wherein the method detects activated T-cells in the skin lesion.

19. The method of claim 12, wherein the one or more therapies are immunotherapies.

20. The method of claim 19, wherein the immunotherapies are selected from pembrolizumab, nivolumab, cemiplimab, atezolizumab, avelumab, durvalumab, ipilimumab, tisotumab vedotin-tftv, tisagenlecleucel, axicabtagene ciloleucel, and blinatumomab.

\* \* \* \* \*